(12) United States Patent
Jang et al.

(10) Patent No.: US 12,273,508 B2
(45) Date of Patent: **\*Apr. 8, 2025**

(54) METHOD AND APPARATUS FOR PROCESSING VIDEO DATA

(71) Applicant: LG Electronics Inc., Seoul (KR)

(72) Inventors: Hyeongmoon Jang, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,697

(22) Filed: Mar. 14, 2024

(65) Prior Publication Data

US 2024/0223750 A1 Jul. 4, 2024

Related U.S. Application Data

(63) Continuation of application No. 17/420,553, filed as application No. PCT/KR2020/000153 on Jan. 3, 2020, now Pat. No. 11,962,756.

(60) Provisional application No. 62/788,777, filed on Jan. 5, 2019.

(51) Int. Cl.
*H04N 19/82* (2014.01)
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/593; H04N 19/11; H04N 19/174
See application file for complete search history.

(56) References Cited

U.S. PATENT DOCUMENTS

2017/0054996 A1* 2/2017 Xu .................. H04N 19/593

\* cited by examiner

*Primary Examiner* — Patrick E Demosky
(74) *Attorney, Agent, or Firm* — Fish & Richardson P.C.

(57) ABSTRACT

A method and device for decoding video data are disclosed. More specifically, a method of decoding video data may comprise: configuring a block vector candidate list of a current block to which an intra block copy (IBC) prediction mode is applied, the IBC mode referring to another block in a current picture; and generating a prediction sample of the current block based on a block vector included in the block vector candidate list. Configuring the block vector candidate list comprises: configuring the block vector candidate list from a spatial neighboring block to which the IBC prediction mode is applied; and modifying the block vector candidate list based on an history-based motion vector prediction (HVMP) candidate to which the IBC prediction mode is applied when a number of current candidates of the block vector candidate list is smaller than a maximum candidate number.

7 Claims, 24 Drawing Sheets

METHOD AND APPARATUS FOR PROCESSING VIDEO DATA

CROSS-REFERENCE TO RELATED APPLICATIONS

This application is a continuation of U.S. application Ser. No. 17/420,553, filed on Jul. 2, 2021, which is a National Stage filing under 35 U.S.C. 371 of International Application No. PCT/KR2020/000153, filed on Jan. 3, 2020, which claims the benefit of U.S. Patent Application No. 62/788,777 filed on Jan. 5, 2019, the contents of which are all hereby incorporated by reference herein in their entirety.

TECHNICAL FIELD

The present disclosure relates to a method and device for processing video signal, and more particularly to a method and device for encoding or decoding video signal by using inter prediction.

BACKGROUND ART

A compression encoding means a series of signal processing techniques for transmitting digitized information through a communication line or techniques for storing the information in the form that is suitable for a storage medium. The media including a video, an image, an audio, and the like may be the target for the compression encoding, and particularly, the technique of performing the compression encoding targeted to the video is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design a coding tool for efficiently processing next-generation video content. Particularly, video codec standards after the high efficiency video coding (HEVC) standard require more efficient prediction techniques.

DISCLOSURE

Technical Problem

An objective of the embodiments of the disclosure is to proposes a video data processing method and apparatus for constructing a merge candidate list or a motion vector prediction candidate in a current picture referencing (CPR) or intra block copy (IBC) prediction mode that performs inter prediction using a current picture as a reference picture.

Objects of the disclosure are not limited to the foregoing, and other unmentioned objects would be apparent to one of ordinary skill in the art from the following description.

Technical Solution

In an aspect of an embodiment of the disclosure, a method of processing video data may comprise: configuring a block vector candidate list of a current block to which an intra block copy (IBC) prediction mode is applied, the IBC mode referring to another block in a current picture; and generating a prediction sample of the current block based on a block vector included in the block vector candidate list, wherein configuring the block vector candidate list comprises: configuring the block vector candidate list from a spatial neighboring block to which the IBC prediction mode is applied; and modifying the block vector candidate list based on an history-based motion vector prediction (HVMP) candidate to which the IBC prediction mode is applied when a number of current candidates of the block vector candidate list is smaller than a maximum candidate number.

In an embodiment, the configuring the block vector candidate list may further comprises adding a zero vector to the modified block vector candidate list when a number of current candidates of the modified block vector candidate list is smaller than the maximum candidate number.

In an embodiment, the adding a zero vector to the modified block vector candidate list may comprises adding a zero vector to the modified block vector candidate list until the number of the current candidates of the modified block vector candidate list becomes the maximum candidate number.

In an embodiment, the spatial neighboring block may include at least one of a left side neighboring block, a left-bottom neighboring block, a top side neighboring block, or a top-right neighboring block.

In an embodiment, the configuring the block vector candidate list may further comprise adding to the modified block vector candidate list a pairwise candidate generated based on a combination of block vectors included in the modified block vector candidate list.

In an embodiment, the method may further comprise adding a zero vector to the block vector candidate list when a number of current candidates of the block vector candidate list to which the pairwise candidate is added is smaller than the maximum candidate number.

In another aspect of an embodiment, a method of encoding video data may comprise: configuring a block vector candidate list of a current block to which an intra block copy (IBC) prediction mode is applied, the IBC mode referring to another block in a current picture; generating a prediction sample of the current block based on a block vector included in the block vector candidate list; and encoding information related to a prediction of the current block, wherein configuring the block vector candidate list comprises: configuring the block vector candidate list from a spatial neighboring block to which the IBC prediction mode is applied; and modifying the block vector candidate list based on an history-based motion vector prediction (HVMP) candidate to which the IBC prediction mode is applied when a number of current candidates of the block vector candidate list is smaller than a maximum candidate number.

In another aspect of an embodiment, an apparatus for decoding video data may comprise: a memory for storing the video data; and a processor coupled with the memory and configured to process the video data, wherein the processor is configured to: configure a block vector candidate list of a current block to which an intra block copy (IBC) prediction mode is applied, the IBC mode referring to another block in a current picture; and generate a prediction sample of the current block based on a block vector included in the block vector candidate list, wherein in order to configure the block vector candidate list the processor is configured to: configure the block vector candidate list from a spatial neighboring block to which the IBC prediction mode is applied; and modify the block vector candidate list based on an history-based motion vector prediction (HVMP) candidate to which the IBC prediction mode is applied when a number of current candidates of the block vector candidate list is smaller than a maximum candidate number.

In yet another aspect of an embodiment, an apparatus for encoding video data may comprise: a memory for storing the video data; and a processor coupled with the memory and configured to process the video data, wherein the processor is configured to: configure a block vector candidate list of a current block to which an intra block copy (IBC) prediction mode is applied, the IBC mode referring to another block in a current picture; generate a prediction sample of the current block based on a block vector included in the block vector candidate list; and encode information related to a prediction of the current block, wherein in order to configure the block vector candidate list the processor is configured to: configure the block vector candidate list from a spatial neighboring block to which the IBC prediction mode is applied; and modify the block vector candidate list based on an history-based motion vector prediction (HVMP) candidate to which the IBC prediction mode is applied when a number of current candidates of the block vector candidate list is smaller than a maximum candidate number.

Advantageous Effects

According to an embodiment of the disclosure, when the CPR (current picture referencing) or IBC (intra block copy) prediction mode is applied to the current block, by constructing a prediction candidate list while excluding temporal neighboring blocks of the current block, a merge or motion vector prediction candidate list can be efficiently constructed.

Effects of the disclosure are not limited to the foregoing, and other unmentioned effects would be apparent to one of ordinary skill in the art from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

MODE FOR INVENTION

Figure 1:
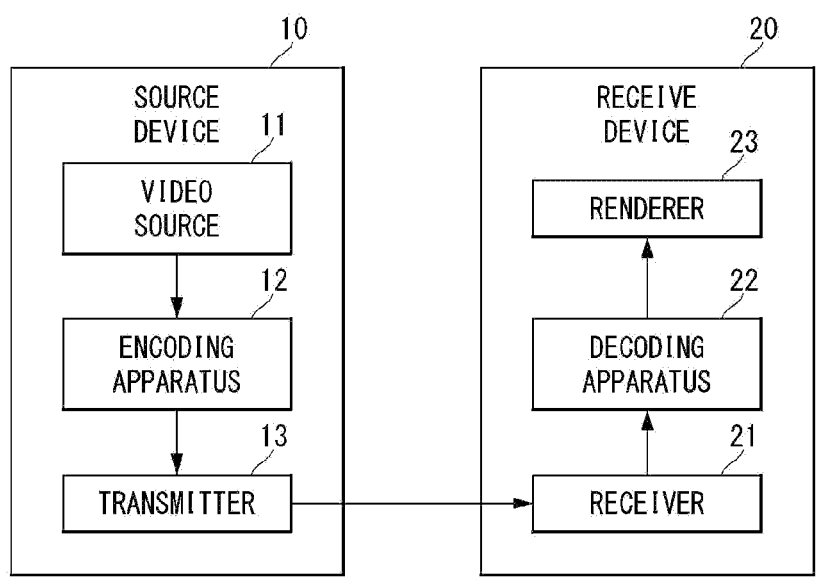
FIG. 1 illustrates an example of a video coding system according to an embodiment of the disclosure.

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a slice, a tile, a frame, a block, etc may be properly replaced and interpreted in each coding process.

Hereinafter, in this specification, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, a coefficient (a transform coefficient or a transform coefficient after a first order transformation) etc. are generally called a sample. Furthermore, to use a sample may mean to use a pixel value, a picture element value, a transform coefficient or the like.

FIG. 1 illustrates an example of a video coding system according to an embodiment of the disclosure.

The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and a transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source 11 may acquire video/image data through a capture, synthesis, or generation process of video/image. The video source may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transform, and quantization for compression and coding efficiency. The encoded data (encoded video/video information) may be output in a form of a bit stream.

The transmitter 13 may transmit the encoded video/video information or data output in the form of a bit stream to the receiver of the receive device through a digital storage medium or a network in a file or streaming format. The digital storage media may include various storage media such as a universal serial bus (USB), a secure digital (SD), a compact disk (CD), a digital video disk (DVD), Bluray, a hard disk drive (HDD), and a solid state drive (SSD). The transmitter 13 may include an element for generating a media file through a predetermined file format, and may include an element for transmission through a broadcast/communication network. The receiver 21 may extract the bit stream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

Figure 2:
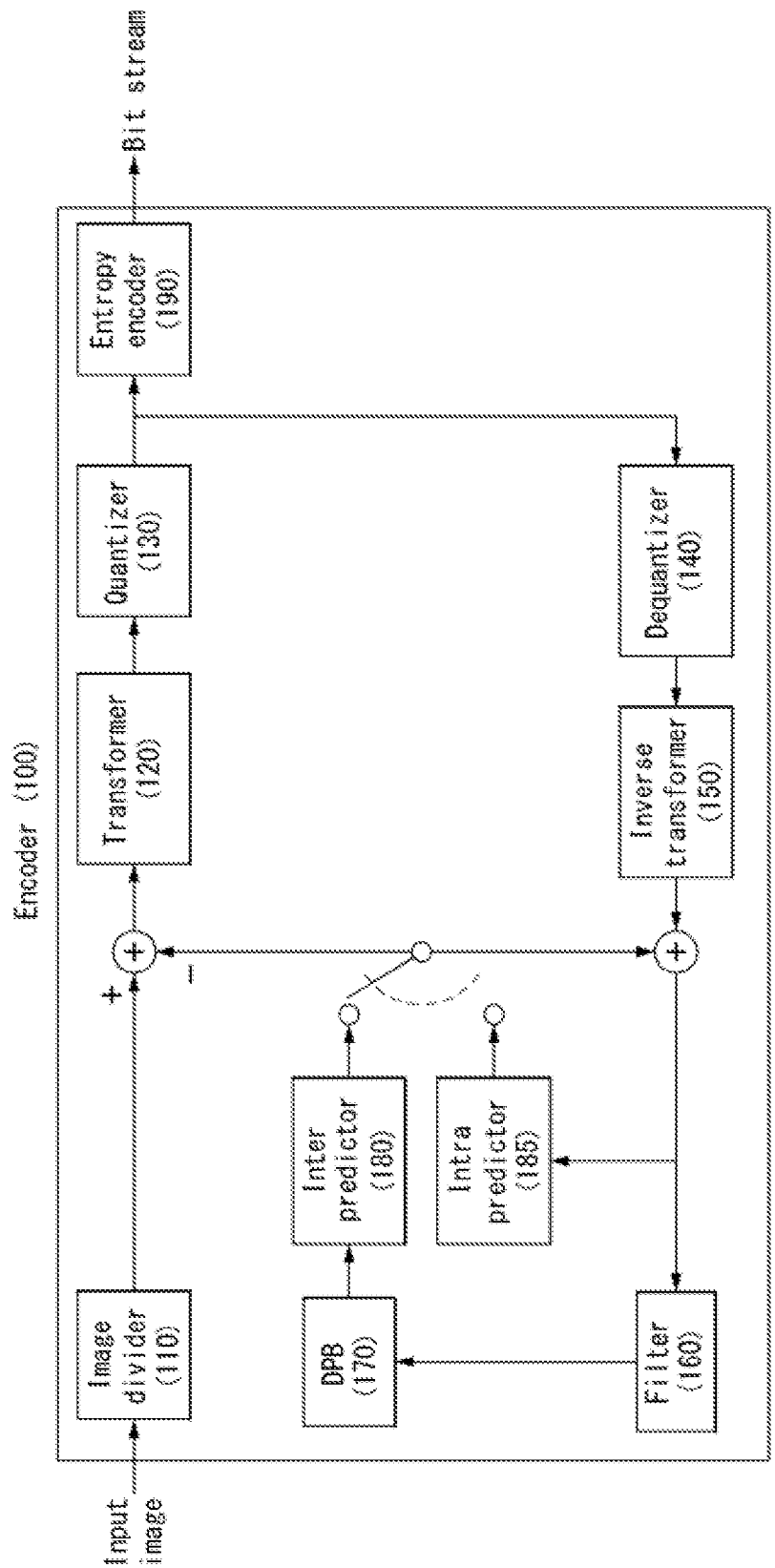
FIG. 2 is an embodiment to which the disclosure is applied, and is a schematic block diagram of an encoding apparatus for encoding a video/image signal.

FIG. 2 is an embodiment to which the disclosure is applied, and is a schematic block diagram of an encoding apparatus for encoding a video/image signal.

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may be configured with a hardware component (for example a memory or a digital storage medium) in an embodiment. And, the memory 170 may include a decoded picture buffer (DPB).

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bit stream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bit stream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bit stream. The bit stream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated)

that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the DPB 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bit stream form.

The modified reconstructed picture transmitted to the DPB 170 may be used as a reference picture in the inter predictor 180. The encoding apparatus can avoid a prediction mismatch in the encoding apparatus 100 and a decoding apparatus and improve encoding efficiency if inter prediction is applied.

The DPB 170 may store a modified reconstructed picture in order to use the modified reconstructed picture as a reference picture in the inter predictor 180.

Figure 3:
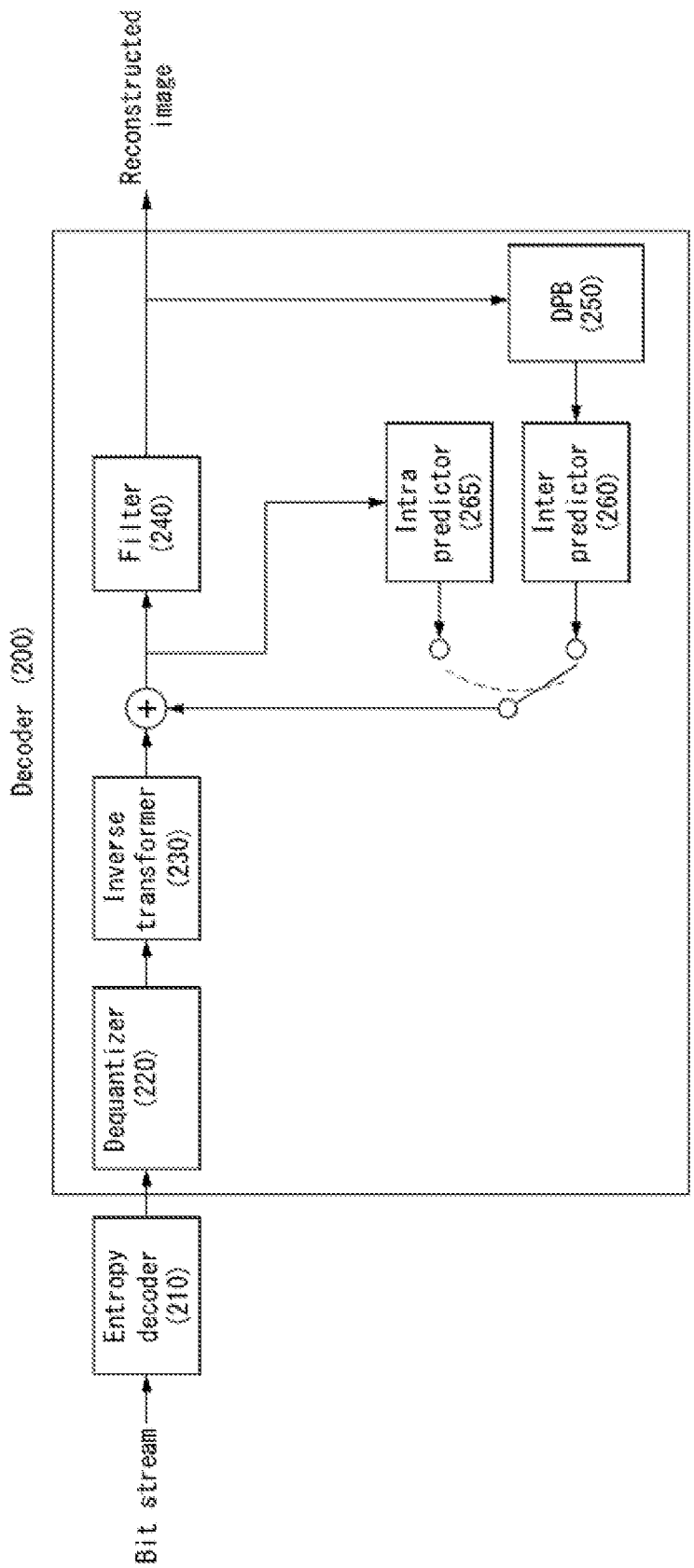
FIG. 3 is an embodiment to which the disclosure is applied, and is a schematic block diagram of a decoding apparatus for decoding a video/image signal.

FIG. 3 is an embodiment to which the disclosure is applied, and is a schematic block diagram of a decoding apparatus for decoding a video/image signal.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the decoded picture buffer 250 may be configured with a hardware component (for example a memory or a digital storage medium) in an embodiment. The memory 250 may include the DPB 175, and may be configured by a digital storage medium.

When a bit stream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bit stream form. The received signal may be decoded through the entropy decoder 210. For example, the entropy decoder 210 may derive information (e.g., video/image information) for image reconstruction (or picture reconstruction) by parsing the bit stream. For example, the entropy decoder 210 may decode information within the bit stream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bit stream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 250. The various filtering methods may include deblocking filtering, a sample adaptive offset SAO, an adaptive loop filter ALF, and a bilateral filter, for example.

A reconstructed picture transmitted (modified) to the decoded picture buffer 250 may be used as a reference picture in the inter predictor 260.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Figure 4:
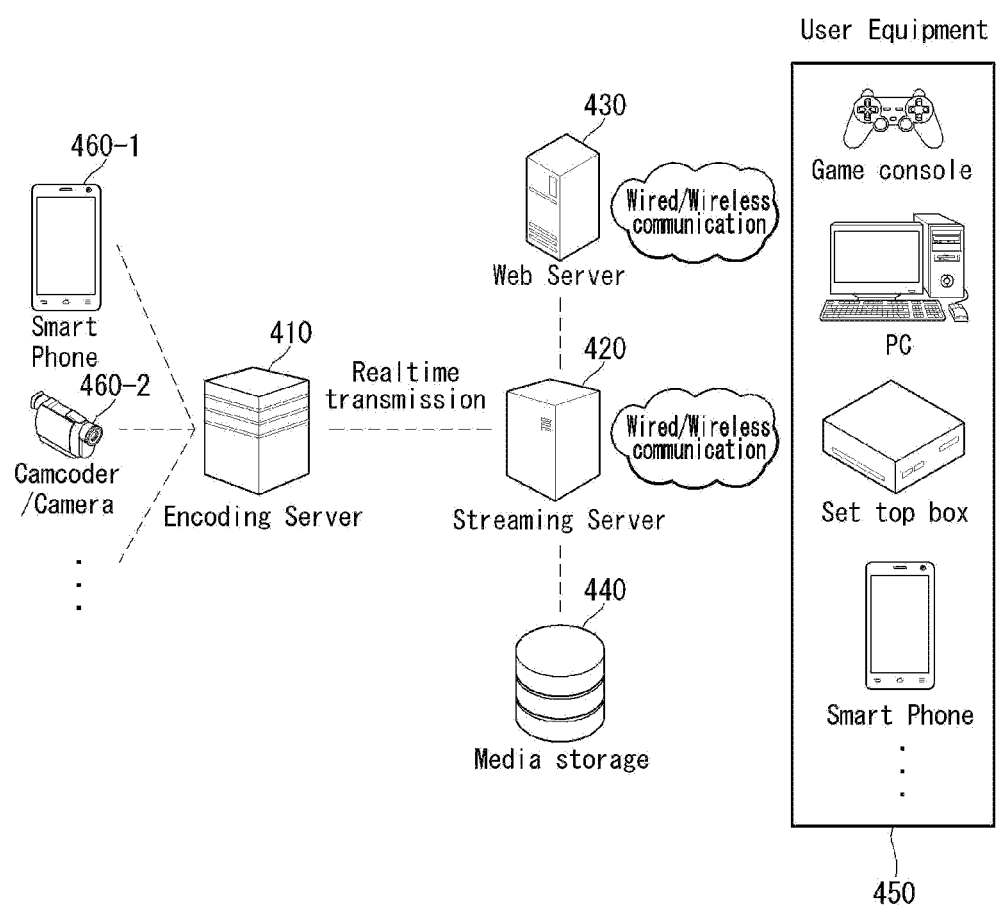
FIG. 4 shows an example of a structural diagram of a content streaming system according to an embodiment of the disclosure.

FIG. 4 shows a structural diagram of a content streaming system according to an embodiment of the disclosure.

The content streaming system to which the disclosure is applied may largely include an encoding server 410, a streaming server 420, a web server 430, a media storage 440, a user device 450, and a multimedia input device 460.

The encoding server 410 may compress the content input from multimedia input devices such as a smartphone, camera, camcorder, etc. into digital data to generate a bit stream and transmit it to the streaming server 420. As another example, when the multimedia input devices 460 such as the smartphone, camera, and camcorder directly generate a bit stream, the encoding server 410 may be omitted.

The bit stream may be generated by an encoding method or a bit stream generation method to which the disclosure is applied, and the streaming server 420 may temporarily store the bit stream in the process of transmitting or receiving the bit stream.

The streaming server 420 transmits multimedia data to the user device 450 based on a user request through the web server 430, and the web server 430 serves as an intermediary to inform the user of what service is present. When a user requests a desired service through the web server 430, the web server 430 delivers it to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bit stream for a predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultra book, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

Figure 5:
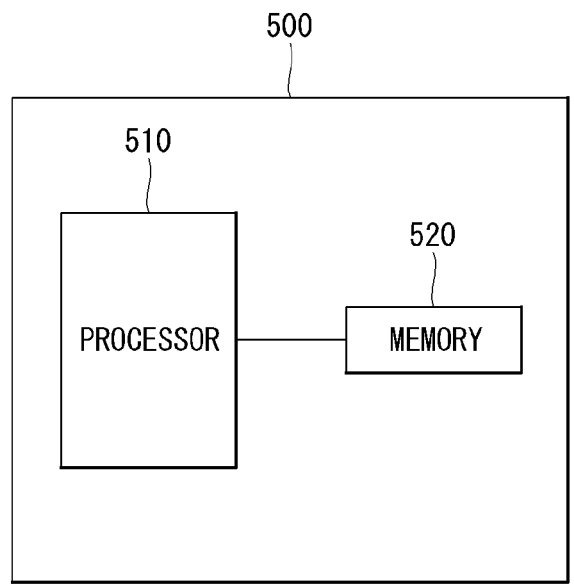
FIG. 5 shows an example of a block diagram of an apparatus for processing a video signal according to an embodiment of the disclosure.

FIG. 5 shows an example of a block diagram of an apparatus for processing a video signal according to an embodiment of the disclosure. The video signal processing apparatus may correspond to the encoding apparatus 100 of FIG. 2 or the decoding apparatus 200 of FIG. 3.

The video signal processing apparatus 500 according to the embodiment of the disclosure may include a memory 520 for storing a video signal, and a processor 510 for processing the video signal while being combined with the memory 520.

The processor 510 according to an embodiment of the disclosure may be configured with at least one processing circuit for processing the video signal, and may process the video signal by executing instructions for encoding or decoding the video signal. That is, the processor 510 may encode the original video signal or decode the encoded video signal by executing the encoding or decoding methods described below.

The video/image coding method according to this document may be performed based on various detailed technologies, and each detailed technology will be outlined as follows. it is obvious to those skilled in the art that the techniques described below may be related to procedures such as prediction, residual processing (transformation, quantization, etc.), syntax element coding, filtering, partitioning/segmentation, etc. in the video/image encoding/decoding procedure described above and/or later.

FIGS. 6A to 6D show embodiments to which the disclosure is applied. FIGS. 6A to 6D respectively illustrate the examples of block splitting structures according to a quad tree (QT), a binary tree (BT), a ternary tree (TT) and an asymmetric tree (AT).

In video coding, one block may be split based on QT. Also, one sub-block split by QT may be further split recursively using QT. A leaf block that is no longer QT split may be split by at least one of BT, TT, or AT. BT may have two types of splitting: horizontal BT (2N×N, 2N×N) and vertical BT (N×2N, N×2N). TT may have two types of splitting: horizontal TT (2N×1/2N, 2N×N, 2N×1/2N) and vertical TT (1/2N×2N, N×2N, 1/2N×2N). AT may have four types of splitting: horizontal-up AT (2N×1/2N, 2N×3/2N), horizontal-down AT (2N×3/2N, 2N×1/2N), vertical-left AT (1/2N×2N, 3/2N×2N), vertical-right AT (3/2N×2N, 1/2N×2N). Each BT, TT, AT may be further split recursively using BT, TT, AT.

Figure 6A:
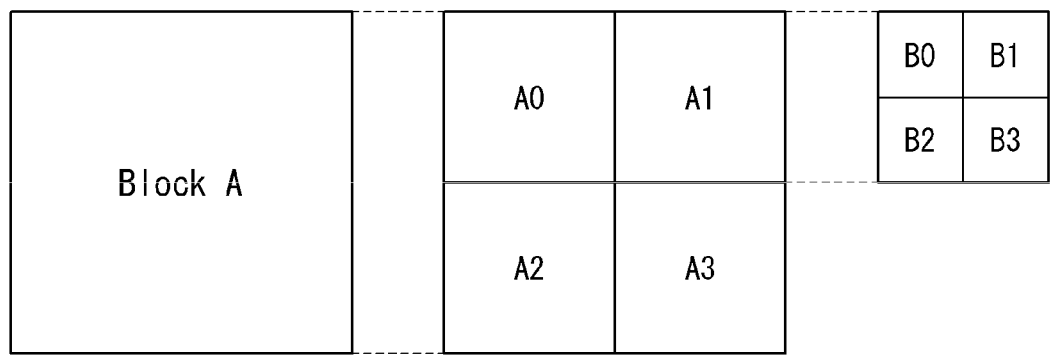
FIGS. 6A to 6D respectively illustrate the examples of block splitting structures according to a quad tree (QT), a binary tree (BT), a ternary tree (TT) and an asymmetric tree (AT).

FIG. 6A shows an example of QT partitioning. The block A may be split into four sub-blocks A0, A1, A2 and A3 by QT. The sub-block A1 may be split into four sub-blocks B0, B1, B2, and B3 again by QT.

Figure 6B:
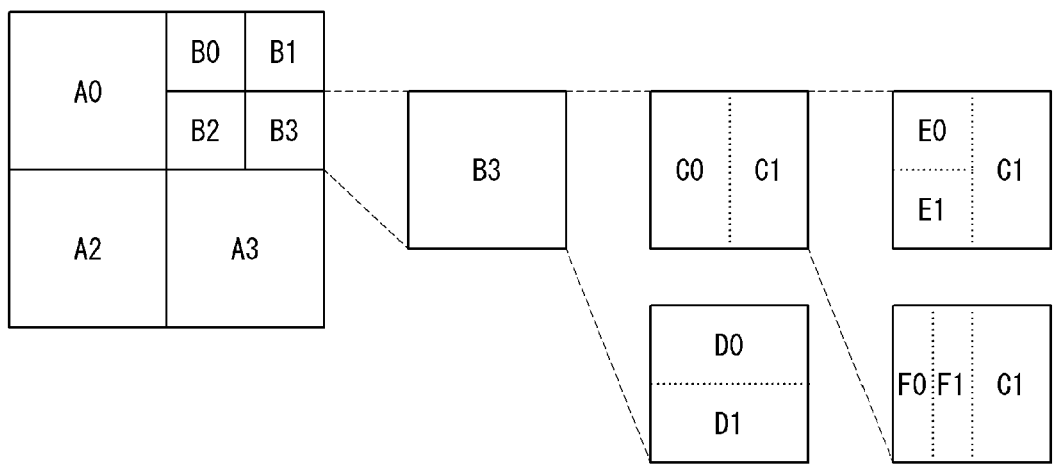

FIG. 6B shows an example of BT partitioning. The block B3, which is no longer split by QT, may be split into vertical BT (C0, C1) or horizontal BT (D0, D1). As the block C0, each sub-block may be further split recursively in a form of horizontal BT (E0, E1) or vertical BT (F0, F1).

Figure 6C:
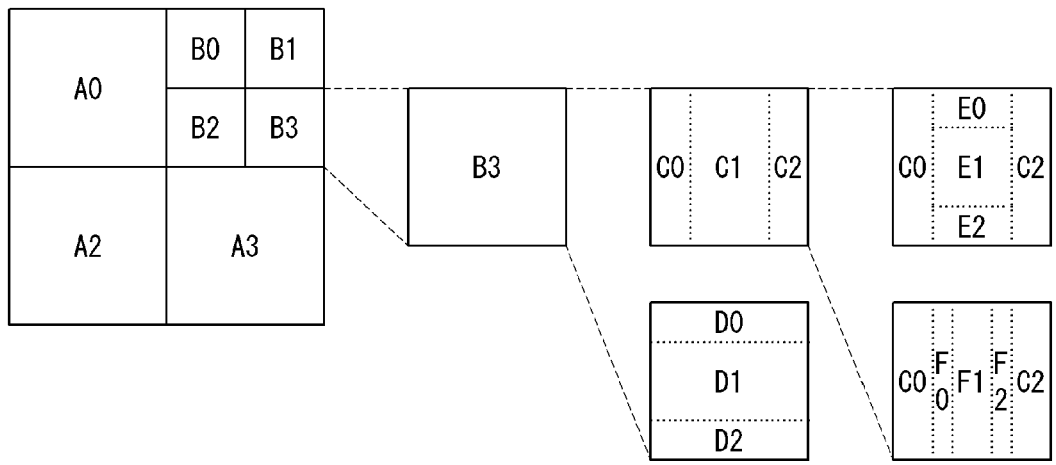

FIG. 6C shows an example of TT partitioning. The block B3, which is no longer split by QT, may be split into vertical TT (C0, C1, C2) or horizontal TT (D0, D1, D2). As the block C1, each sub-block may be further recursively split into a form of horizontal TT (E0, E1, E2) or vertical TT (F0, F1, F2).

Figure 6D:
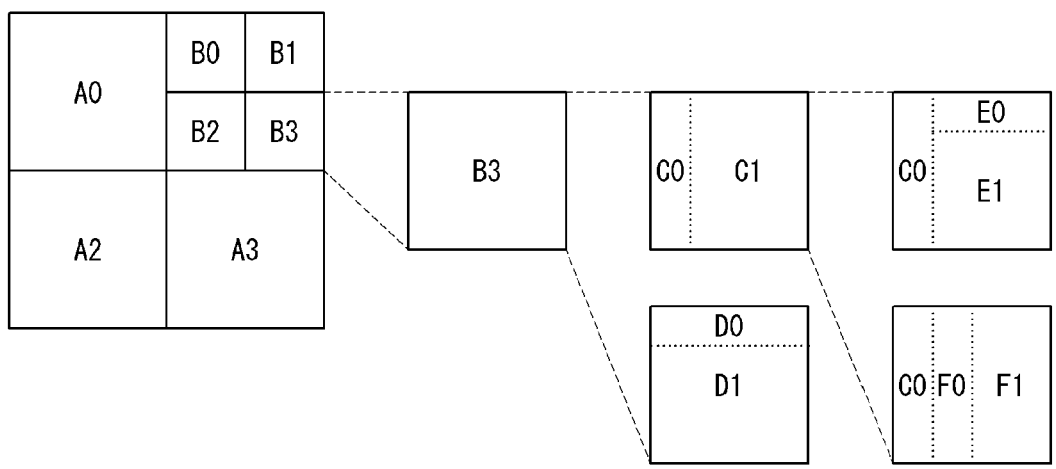

FIG. 6D shows an example of AT partitioning. The block B3, which is no longer split by QT, may be split into vertical AT (C0, C1) or horizontal AT (D0, D1). As the block C1, each sub-block may be further recursively split in a form of horizontal AT (E0, E1) or vertical TT (F0, F1).

Meanwhile, BT, TT and AT partitionings may be used together to partition a block. For example, a sub-block split by BT may be split by TT or AT. In addition, the sub-block split by TT may be split by BT or AT. The sub-block split by AT may be split by BT or TT. For example, after horizontal BT splitting, each sub-block may be split into vertical BT, or after vertical BT splitting, each sub-block may be split into horizontal BT. The cases have different splitting order, but final split shapes are same.

Furthermore, when a block is split, the order in which the block are searched may be variously defined. In general, the search operation is performed from left to right and from top to bottom. Searching a block may mean an order of determining whether to further split each split sub-block, or an encoding order of respective sub-blocks when the block is no longer split, or a search order when sub-blocks refer to information of other neighboring blocks.

Transformation may be performed for each processing unit (or transformation block) divided by the partitioning structure as shown in FIGS. 6A to 6D, and in particular, a transformation matrix may be applied separately to each row direction and column direction. According to an embodiment of the disclosure, different transform types may be used depending on the length of the row direction or the column direction of the processing unit (or transform block).

Figure 7:
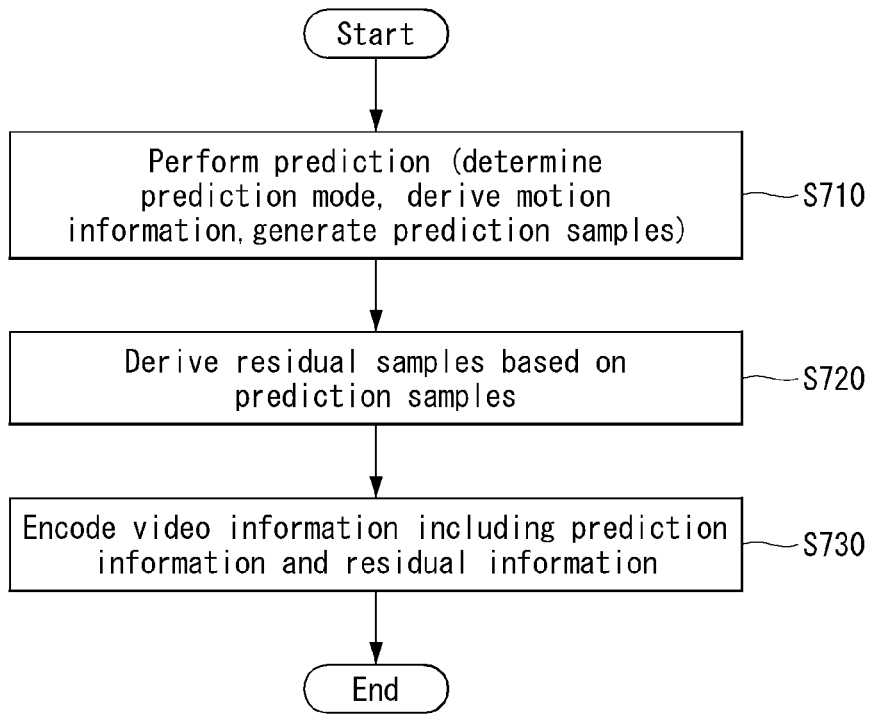
FIGS. 7 and 8 are respectively an inter prediction-based video/image encoding procedure and an inter predictor within an encoding apparatus according to an embodiment of the disclosure.
Figure 8:
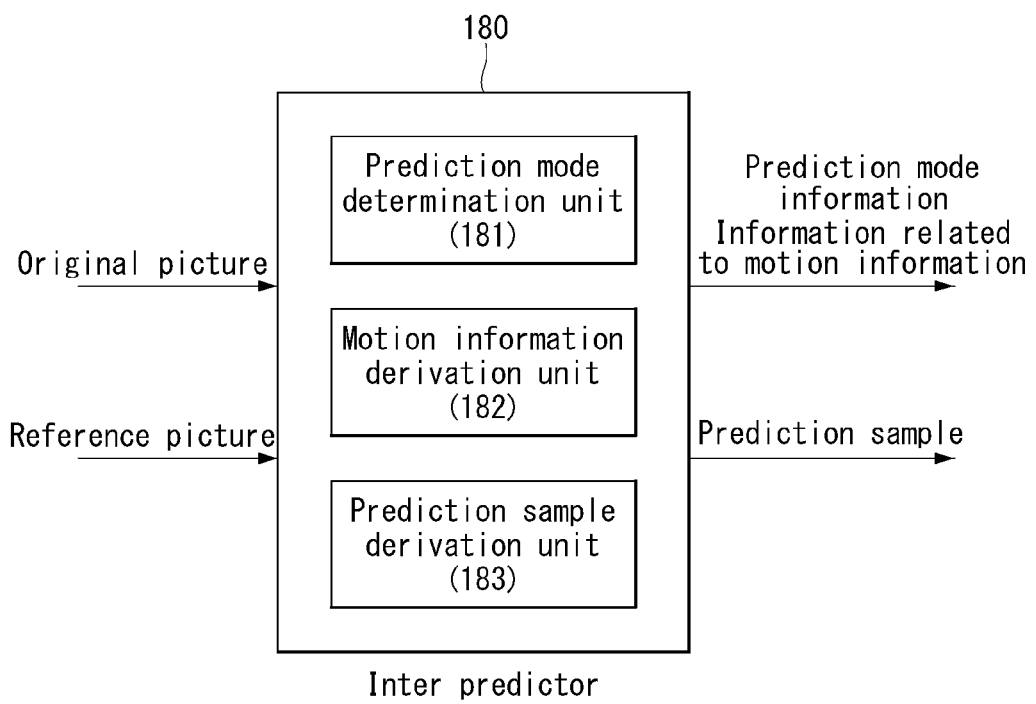

FIGS. 7 and 8 are respectively an inter prediction-based video/image encoding procedure and an inter predictor within an encoding apparatus according to an embodiment of the disclosure.

The encoding apparatus 100 performs inter prediction on a current block (S710). The encoding apparatus 100 may derive an inter prediction mode and motion information of a current block, and may generate the prediction samples of the current block. In this case, the inter prediction mode determination, motion information derivation and prediction sample generation procedure may be performed at the same time, and any one procedure may be performed prior to another procedure. For example, the inter predictor 180 of the encoding apparatus 100 may include a prediction mode determination unit 181, a motion information derivation unit 182, and a prediction sample derivation unit 183. The prediction mode determination unit 181 may determine a prediction mode for a current block. The motion information derivation unit 182 may derive motion information of the current block. The prediction sample derivation unit 183 may derive prediction samples of the current block. For example, the inter predictor 180 of the encoding apparatus 100 may search a given area (search area) of reference pictures for a block similar to a current block through motion estimation, and may derive a reference block having a minimum difference or a difference of a given reference or less with respect to the current block. The inter predictor 180 may derive a reference picture index indicating a reference picture in which a reference block is located based on the reference block, and may derive a motion vector based on a location difference between the reference block and the current block. The encoding apparatus 100 may determine a mode applied to the current block among various prediction modes. The encoding apparatus may compare RD costs for the various prediction modes, and may determine an optimal prediction mode for the current block.

For example, if a skip mode or merge mode is applied to the current block, the encoding apparatus 100 may configure a merge candidate list to be described later, and may derive a reference block having a minimum difference or a difference of a given reference or less with respect to the current block among reference blocks indicated by merge candidates included in a merge candidate list. In this case, a merge candidate associated with the derived reference block may be selected. Merge index information indicating the selected merge candidate may be generated and signaled to the decoding apparatus 200. Motion information of the current block may be derived using motion information of the selected merge candidate.

For another example, if an (A)MVP mode is applied to the current block, the encoding apparatus may configure an (A)MVP candidate list to be described later, and may use a motion vector of a motion vector predictor (mvp) candidate, selected among mvp candidates included in the (A)MVP candidate list, as the mvp of the current block. In this case, for example, a motion vector indicating the reference block derived by the motion estimation may be used as the motion vector of the current block. An mvp candidate including a motion vector having the smallest difference with respect to the motion vector of the current block, among the mvp candidates, may become the selected mvp candidate. A motion vector difference (MVD), that is, a difference obtained by subtracting the mvp from the motion vector of the current block, may be derived. In this case, information on the MVD may be signaled to the decoding apparatus 200. Furthermore, if an (A)MVP mode is applied, a value of the reference picture index may be configured as reference picture index information and may be separately signaled to the decoding apparatus.

The encoding apparatus 100 may derive residual samples based on the prediction samples (S720). The encoding apparatus 100 may derive the residual samples through a comparison between the original samples of the current block and the prediction samples.

The encoding apparatus 100 encodes image information including prediction information and residual information (S730). The encoding apparatus may output the encoded image information in a bitstream form. The prediction information may include information on prediction mode information (e.g., skip flag, merge flag or mode index) and motion information as information related to the prediction procedure. The information related to motion information may include candidate selection information (e.g., merge index, mvp flag or mvp index), that is, information for deriving a motion vector. Furthermore, the information related to motion information may include information on the MVD and/or reference picture index information. Furthermore, the information related to motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus over a network.

Meanwhile, as described above, the encoding apparatus may generate a reconstructed picture (including reconstructed samples and reconstructed block) based on the reference samples and the residual samples. This is for deriving, in the encoding apparatus 100, the same prediction results as those performed in the decoding apparatus 200. Accordingly, coding efficiency can be improved. Accordingly, the encoding apparatus 100 may store the reconstructed picture (or reconstructed samples and reconstructed block) in the memory, and may use the reconstructed picture as a reference picture for inter prediction. As described above, an in-loop filtering procedure may be further applied to the reconstructed picture.

Figure 9:
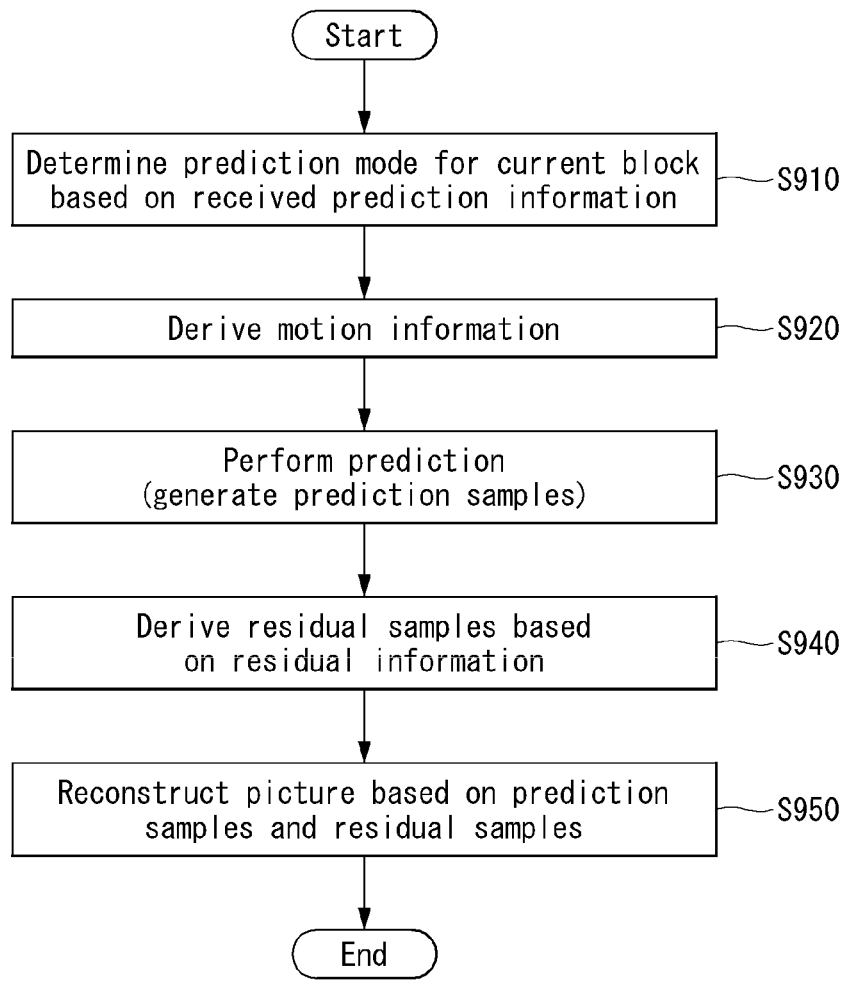
FIGS. 9 and 10 are respectively an inter prediction-based video/image decoding procedure and an inter predictor within a decoding apparatus according to an embodiment of the disclosure.
Figure 10:
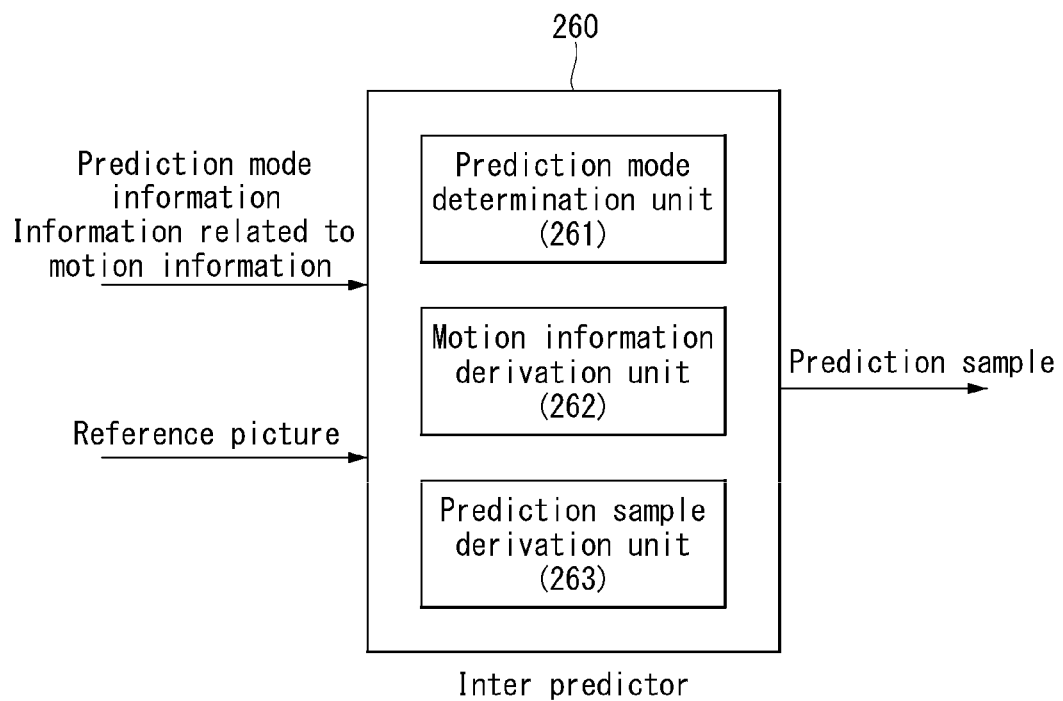

FIGS. 9 and 10 are respectively an inter prediction-based video/image decoding procedure and an inter predictor within a decoding apparatus according to an embodiment of the disclosure.

The decoding apparatus 200 may perform an operation corresponding to an operation performed in the encoding apparatus 100. The decoding apparatus 200 may perform prediction on a current block based on received prediction information, and may derive prediction samples.

Specifically, the decoding apparatus 200 may determine a prediction mode for the current block based on received prediction information (S910). The decoding apparatus 200 may determine which inter prediction mode is applied to the current block based on prediction mode information within the prediction information.

For example, the decoding apparatus 200 may determine whether the merge mode or (A)MVP mode is applied to the current block based on the merge flag. Alternatively, the decoding apparatus 200 may select one of various inter prediction mode candidates based on the mode index. The inter prediction mode candidates may include a skip mode, a merge mode and/or an (A)MVP mode or may include various inter prediction modes to be described later.

The decoding apparatus 200 derives motion information of the current block based on the determined inter prediction mode (S920). For example, if a skip mode or merge mode is applied to the current block, the decoding apparatus 200 may configure a merge candidate list to be described later and select one of merge candidates included in the merge candidate list. The selection of the merge candidate may be performed based on the merge index. Motion information of the current block may be derived from the motion information of the selected merge candidate. The motion information of the selected merge candidate may be used the motion information of the current block.

For another example, if an (A)MVP mode is applied to the current block, the decoding apparatus 200 may configure an (A)MVP candidate list to be described later, and may use a motion vector of a motion vector predictor (mvp) candidate, selected among mvp candidates included in the (A)MVP candidate list, as the mvp of the current block. The selection may be performed based on the selection information (mvp flag or mvp index). In this case, the decoding apparatus 200 may derive the MVD of the current block based on information on the MVD. The decoding apparatus may derive the motion vector of the current block based on the mvp of the current block and the MVD. Furthermore, the decoding apparatus may derive the reference picture index of the current block based on the reference picture index information. A picture indicated by the reference picture index within a reference picture list regarding the current block may be derived as a reference picture referred for the inter prediction of the current block.

Meanwhile, as will be described later, motion information of the current block may be derived without a candidate list configuration. In this case, motion information of the current block may be derived according to a procedure disclosed in a prediction mode to be described later. In this case, a candidate list configuration, such as that described above, may be omitted.

The decoding apparatus 200 may generate prediction samples for the current block based on the motion information of the current block (S930). In this case, the decoding apparatus 200 may derive a reference picture based on the reference picture index of the current block, and may derive the prediction samples of the current block indicated on the reference picture by the motion vector of the current block. In this case, as will be described later, a prediction sample filtering procedure may be further performed on some of or all the prediction samples of the current block according to circumstances.

For example, the inter predictor 260 of the decoding apparatus 200 may include a prediction mode determination unit 261, a motion information derivation unit 262, and a prediction sample derivation unit 263. The decoding apparatus 200 may determine a prediction mode of the current block based on prediction mode information received from the prediction mode determination unit 261, may derive motion information (motion vector and/or the reference picture index) of the current block based on information related to motion information received from the motion information derivation unit 262. The prediction sample derivation unit 263 may derive the prediction samples of the current block.

The decoding apparatus 200 generates residual samples for the current block based on the received residual information (S940). The decoding apparatus 200 may generate reconstructed samples for the current block based on the prediction samples and the residual samples, and may generate a reconstructed picture based on the reconstructed samples (S950). Thereafter, as described above, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

Various inter prediction modes may be used for the prediction of a current block within a picture. For example, various modes, such as a merge mode, a skip mode, an MVP mode, and an affine mode, may be used. A decoder side motion vector refinement (DMVR) mode, an adaptive motion vector resolution (AMVR) mode, etc. may be further used as additional modes. The affine mode may be referred to as an affine motion prediction mode. The MVP mode may be referred to as an advanced motion vector prediction (AMVP) mode.

Prediction mode information indicating an inter prediction mode of a current block may be signaled from an encoding apparatus to a decoding apparatus. The prediction mode information may be included in a bitstream and received by the decoding apparatus. The prediction mode information may include index information indicating one of multiple candidate modes. Alternatively, an inter prediction mode may be indicated through the hierarchical signaling of flag information. In this case, the prediction mode information may include one or more flags. For example, a flag may be further signaled in order to indicate whether a skip mode is applied by signaling a skip flag, to indicate whether a merge mode is applied by signaling a merge flag if a skip mode is not applied, and to indicate that an MVP mode is applied if a merge mode is not applied or for an additional identification. The affine mode may be signaled as an independent mode or may be signaled as a mode dependent on a merge mode or MVP mode. For example, the affine mode may be configured as one of a merge candidate list or MVP candidate list, as will be described later.

The encoding apparatus 100 or the decoding apparatus 200 may perform inter prediction using motion information of a current block. The encoding apparatus 100 may derive optimal motion information for a current block according to a motion estimation procedure. For example, the encoding apparatus 100 may search a reference block having a similar correlation using the original block within the original picture for a current block in a fraction pixel unit within a determined search range within a reference picture. Accordingly, the encoding apparatus may derive motion information. The similarity of a block may be derived based on a difference between phase-based sample values. For example, the similarity of a block may be calculated based on a SAD (Sum of Absolute Difference) between a current block (or the template of the current block) and a reference block (or the template of the reference block). In this case, motion information may be derived based on a reference block having the smallest SAD within a search area. The derived motion information may be signaled to the decoding apparatus using several methods based on an inter prediction mode.

If a merge mode is applied, motion information of a current prediction block is not directly transmitted, and motion information of the current prediction block is derived using motion information of a neighboring prediction block. Accordingly, the encoding apparatus 100 may indicate the motion information of the current prediction block by transmitting flag information to notify that a merge mode has been used and a merge index to notify which neighboring prediction block has been used.

The encoding apparatus 100 should search a merge candidate block used to derive motion information of a current prediction block in order to perform a merge mode. For example, a maximum of up to 5 merge candidate blocks may be used, but the disclosure is not limited thereto. Furthermore, a maximum number of merge candidate blocks may be transmitted in a slice header, and the disclosure is not limited thereto. After searching merge candidate blocks, the encoding apparatus 100 may generate a merge candidate list, and may select a merge candidate block having the smallest cost, among the merge candidate blocks, as the final merge candidate block.

An embodiment of the disclosure provides various embodiments of merge candidate blocks constructing a merge candidate list.

The merge candidate list may use 5 merge candidate blocks, for example. For example, 4 spatial merge candidates and 1 temporal merge candidate may be used.

Figure 11:
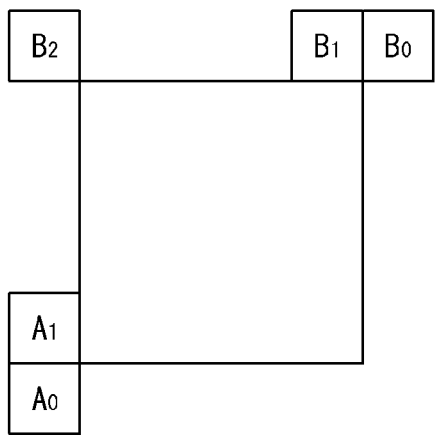
FIG. 11 illustrates an example of constructing spatial merge candidates for a current block.

FIG. 11 illustrates an example of constructing spatial merge candidates for a current block.

Referring to FIG. 11, for prediction of a current block, at least one of a left neighboring block A1, a bottom-left neighboring block A2, a top-right neighboring block B0, an upper neighboring block B1, and a top-left neighboring block B2 may be used. The merge candidate list for the current block may be configured based on the procedure shown in FIG. 12.

Figure 12:
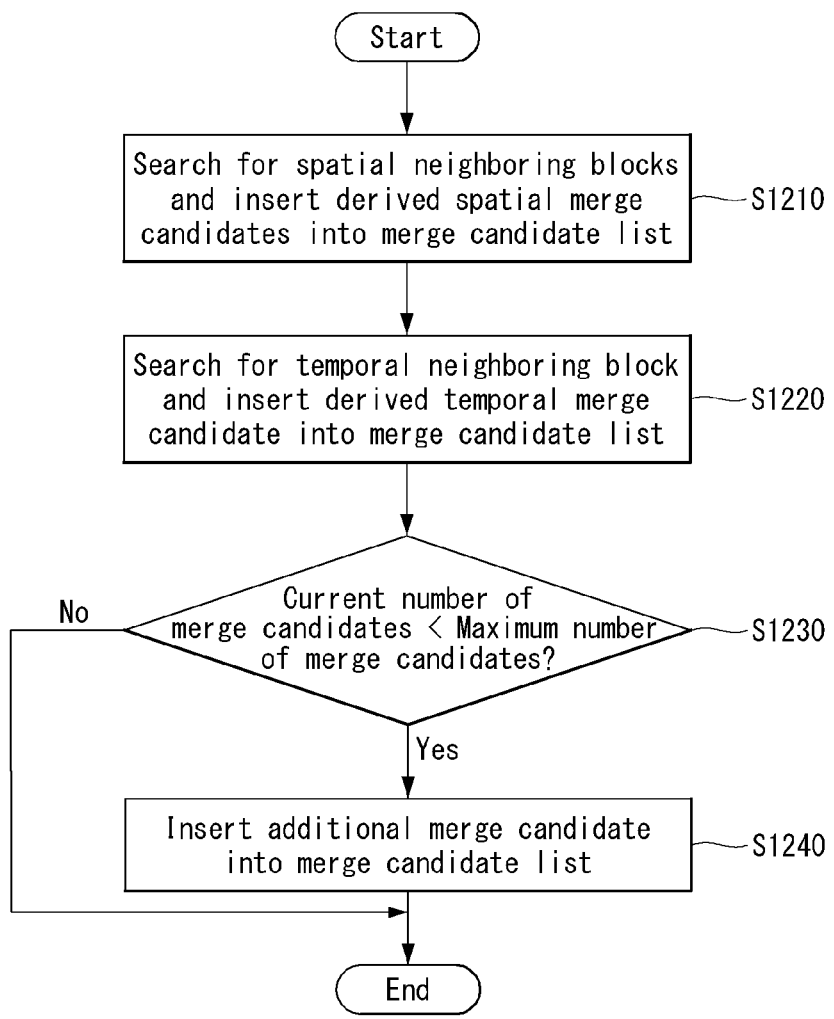
FIG. 12 is a flowchart illustrating a method of configuring a merge candidate list according to an embodiment to which the disclosure is applied.

FIG. 12 is a flowchart illustrating a method of configuring a merge candidate list according to an embodiment to which the disclosure is applied.

A coding apparatus (the encoding apparatus 100 or the decoding apparatus 200) searches spatial neighboring blocks of a current block and inserts derived spatial merge candidates into a merge candidate list (S1210). For example, the spatial neighboring blocks may include the bottom left corner neighboring block, left neighboring block, top right corner neighboring block, top neighboring block, and top left corner neighboring block of the current block. In this case, this is an example, and additional neighboring blocks, such as a right neighboring block, a bottom neighboring block, and a bottom right neighboring block, in addition to the spatial neighboring blocks may be further used as the spatial neighboring blocks. The coding apparatus may detect available blocks by searching the spatial neighboring blocks based on priority, and may derive motion information of the detected blocks as the spatial merge candidates. For example, the encoding apparatus 100 or the decoding apparatus 200 may search the 5 blocks illustrated in FIG. 11 in the sequence of A1, B1, B0, A0, and B2, and may configure a merge candidate list by sequentially indexing available candidates.

The coding apparatus searches a temporal neighboring block of the current block and inserts a derived temporal merge candidate into the merge candidate list (S1220). The temporal neighboring block may be located on a reference picture, that is, a picture different from a current picture in which the current block is located. A reference picture in which the temporal neighboring block is located may be called a co-located picture or a col-picture. The temporal neighboring block may be searched in the sequence of the bottom right corner neighboring block and bottom right center block of a co-located block for the current block on the col-picture. Meanwhile, if motion data compression is applied, specific motion information may be stored in the col-picture as representative motion information for each given storage unit. In this case, it is not necessary to store motion information for all blocks within the given storage unit, and thus a motion data compression effect can be obtained. In this case, the given storage unit may be predetermined as a 16×16 sample unit or an 8×8 sample unit, for example, or size information for the given storage unit may be signaled from the encoding apparatus 100 to the decoding apparatus 200. If the motion data compression is applied, motion information of the temporal neighboring block may be substituted with representative motion information of the given storage unit in which the temporal neighboring block is located. That is, in this case, in an implementation aspect, after an arithmetic right shift is performed by a given value based on the coordinates (top left sample position) of the temporal neighboring block not a prediction block in which the coordinates of the temporal neighboring block are located, the temporal merge candidate may be derived based on motion information of a prediction block that covers the arithmetic left-shifted location. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the current number of merge candidates is smaller than a maximum number of merge candidates (S1230). The maximum number of merge candidates may be pre-defined or may be signaled from the encoding apparatus 100 to the decoding apparatus 200. For example, the encoding apparatus 100 may generate information on the maximum number of merge candidates, may encode the information, and may transmit the information to the decoding apparatus 200 in a bitstream form. If the maximum number of merge candidates is filled, a candidate addition process may not be performed.

If, as a result of the check, the current number of merge candidates is smaller than the maximum number of merge candidates, the coding apparatus inserts an added merge candidate into the merge candidate list (S1240). The added merge candidate may include an ATMVP (Adaptive Temporal Motion Vector Prediction), a combined bi-predictive merge candidate (if the slice type of a current slice is a B type) and/or a zero vector merge candidate, for example.

Figure 13:
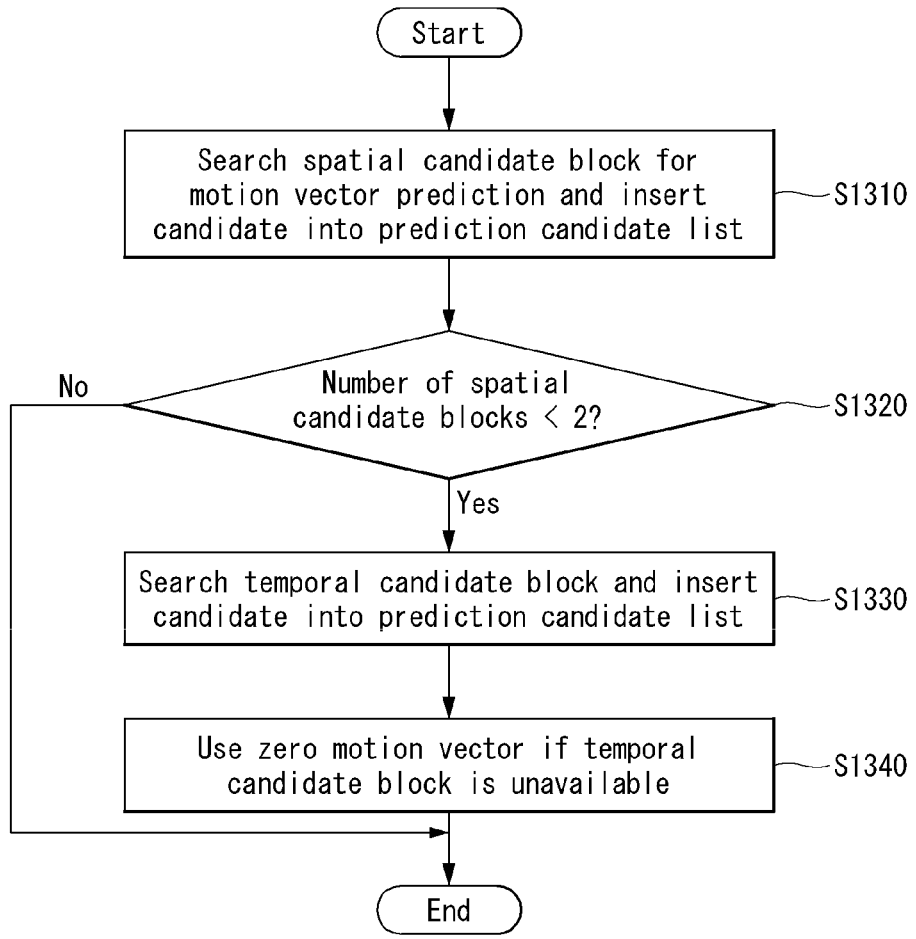
FIG. 13 is a flowchart illustrating a method of configuring a prediction candidate list (MVP candidate list) according to an embodiment to which the disclosure is applied.

FIG. 13 is a flowchart illustrating a method of configuring a prediction candidate list (MVP candidate list) according to an embodiment to which the disclosure is applied.

If a motion vector prediction (MVP) mode is applied, a motion vector predictor (mvp) candidate list may be generated based on a motion vector of a reconstructed spatial neighboring block (e.g., the neighboring block described in FIG. 11) and/or a motion vector corresponding to a temporal neighboring block (or Col block). That is, the motion vector of the reconstructed spatial neighboring block and/or the motion vector of the temporal neighboring block may be used as a motion vector predictor candidate. The information on prediction may include selection information (e.g., MVP flag or MVP index) indicating an optimal motion vector predictor candidate selected among motion vector predictor candidates included in the list. In this case, the predictor may select the motion vector predictor of a current block, among motion vector predictor candidates included in a motion vector candidate list, using the selection information. The predictor of the encoding apparatus 100 may calculate a motion vector difference (MVD) between the motion vector of the current block and the motion vector predictor, may encode the MVD, and may output the encoded MVD in a bitstream form. That is, the MVD may be calculated as a value obtained by subtracting the motion vector predictor from the motion vector of the current block. In this case, the predictor of the decoding apparatus may obtain a motion vector difference included in the information on prediction, and may derive the motion vector of the current block through the addition of the motion vector difference and the motion vector predictor. The predictor of the decoding apparatus may obtain or derive a reference picture index indicating a reference picture from the information on prediction. For example, a motion vector predictor candidate list may be configured as illustrated in FIG. 13.

Referring to FIG. 13, the coding apparatus searches for a spatial candidate block for motion vector prediction and inserts it into a prediction candidate list (S1310). For example, the coding apparatus may search for neighboring blocks according to a predetermined search order, and add information of the neighboring block satisfying the condition for the spatial candidate block to the prediction candidate list (MVP candidate list).

After constructing the spatial candidate block list, the coding apparatus compares the number of spatial candidates included in the prediction candidate list with a preset reference number (eg, 2) (S1320). If the number of the spatial candidates included in the prediction candidate list is greater than or equal to the reference number (eg, 2), the coding apparatus may end the construction of the prediction candidate list.

But if the number of spatial candidate lists included in the prediction candidate list is less than the reference number (eg, 2), the coding apparatus searches for a temporal candidate block and inserts it into the prediction candidate list (S1330), and when the temporal candidate block is unavailable, adds a zero motion vector to the prediction candidate list (S1340).

A predicted block for a current block may be derived based on the motion information derived according to a prediction mode. The predicted block may include prediction samples (prediction sample array) of the current block. When the motion vector of the current block indicates a fractional sample unit, an interpolation procedure may be performed, and through this prediction samples of the current block may be derived based on the reference samples in a fractional sample unit in a reference picture. When affine inter prediction is applied to the current block, prediction samples may be generated based on a motion vector in a sample/subblock unit. When bi-direction prediction is applied, final prediction samples may be derived through weighted (according to the phase) sums of prediction samples derived based on first direction prediction (eg, L0 prediction) and prediction samples derived based on second direction prediction. Reconstruction samples and reconstruction pictures may be generated based on the derived prediction samples, and as described above, a procedure such as in-loop filtering may be performed afterwards.

Hereinafter, an IBC (intra block copy) prediction is described as an example of the inter prediction. The IBC may be used for, for example, the content video coding for games such as SCC (screen content coding). The IBC basically performs an prediction within a current picture, but may be performed in a similar way as the inter prediction in that a reference block is derived within the current picture. That is, the IBC may use at least one of the inter prediction techniques described in this document. For example, the IBC may use at least one of the above-described methods for deriving motion information (motion vector). The IBC may refer to the current picture, and thus may be called current picture referencing (CPR). As such, a prediction technique using another block as a reference block in the current picture including a current block (that is, using the current picture as a reference picture) may be referred to as the IBC or the CPR, but the embodiments of the present document are not limited to specific terms and may be substituted with other appropriate terms.

For IBC, the encoding apparatus 100 may perform block matching (BM) to derive an optimal block vector (or motion vector) for a current block (eg, CU). The derived block vector (or motion vector) may be signaled to the decoding apparatus 200 through a bitstream using a method similar to the above-described block information (motion vector) signaling in the inter prediction. The decoding apparatus 200 may derive a reference block for the current block in the current picture through the signaled block vector (motion vector), and may derive a prediction signal (predicted block or prediction samples) for the current block through this. Here, the block vector (or motion vector) may indicate a displacement from the current block to the reference block located in an already reconstructed region in the current picture. Accordingly, the block vector (or motion vector) may be referred to as a displacement vector. Hereinafter, in the IBC, a motion vector may correspond to the block vector or the displacement vector. The motion vector of the current block may include a motion vector for a luma component (luma motion vector) or a motion vector for a chroma component (chroma motion vector). For example, a luma motion vector for an IBC-coded CU may be an integer sample unit (ie, integer precision). The chroma motion vector may also be clipped in units of integer samples. As described above, the IBC may use at least one of inter prediction techniques. For example, when the IBC is applied together with an AMVR, 1-pel and 4-pel motion vector precisions may be switched to each other.

In order to reduce memory usage and decoding complexity, a restored portion of a preset area including a current CTU may be used. This restriction may allow the IBC mode to be implemented using actual on-chip memory for hardware implementation.

At an encoder side, hash-based motion prediction is performed for the IBC. The encoder performs an RD check on blocks with a width not greater than 16 luminance samples. For a non-merge mode, a block vector search is preferentially performed using a hash-based search. If the hash does not return a valid candidate, a block matching based on local search is performed.

In the hash-based search, a hash key matching (32-bit CRC) between the current block and the reference block is extended to all allowed block sizes. The hash key calculation for all positions in the current picture is based on 4×4 subblocks. If all the hash keys of the 4×4 subblocks match the hash keys at the corresponding reference positions, for the current block of larger sizes, it is determined that the hash key matches the hash key of the reference block. If the hash keys of a plurality of reference blocks match the hash key of the current block, a block vector of each of the matching reference blocks is calculated and the one with the minimum cost is selected.

In a block matching search, a search range is set to N samples to the left and upper side of the current block in the current CTU. At the beginning of the CTU, if there is no temporal reference picture, the value of N is initialized to 128, and if there is at least one temporal reference picture, the value of N is initialized to 64. The hash hit ratio is defined as the percentage of samples in the CTU that found a match using the hash-based search. While encoding the current CTU, if the hash hit ratio is less than 5%, N is halved.

At a CU level, the IBC mode is signaled using a flag, and may be signaled as an IBC AMVP mode or an IBC skip/merge mode as follows.

IBC skip/merge mode: a merge candidate index is used to indicate block vectors in a list from neighboring candidate IBC coded blocks used to predict the current block.

IBC AMVP mode: a block vector difference is coded in the same way as a motion vector difference. The block vector prediction method uses two candidates as predictors, and one for a left neighboring block and the other for a upper neighboring block (if coded with the IBC). If both neighboring blocks are not available, the default block vector is used as the predictor. A flag is signaled to indicate a block vector predictor index.

Figure 14:
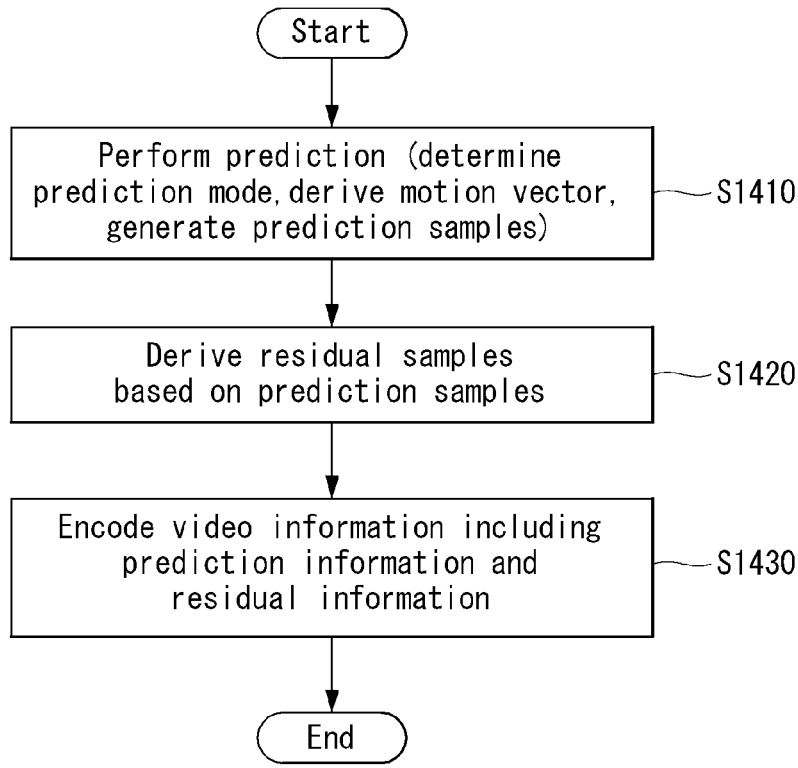
FIGS. 14 and 15 show examples of a prediction unit in an IBC prediction-based video/image encoding method and an encoding apparatus according to an embodiment of the present specification.
Figure 15:
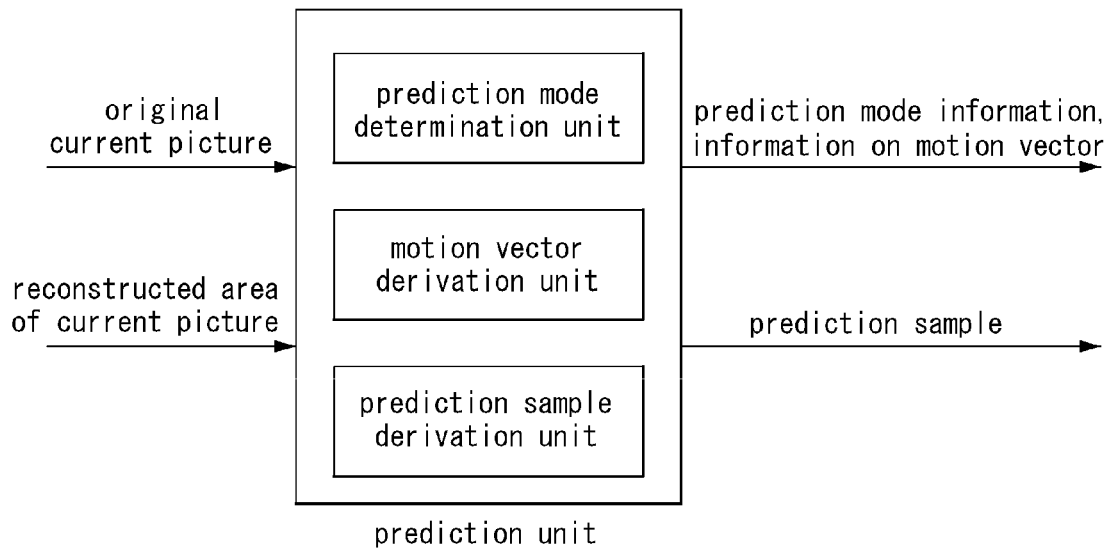

FIGS. 14 and 15 show examples of a prediction unit in an IBC prediction-based video/image encoding method and an encoding apparatus according to an embodiment of the present specification.

The encoding apparatus 100 performs the IBC prediction (IBC-based prediction) for a current block (S1410). The encoding apparatus 100 may derive a prediction mode and a motion vector of the current block, and generate prediction samples of the current block. The prediction mode may include at least one of the above-described inter prediction modes. Here, the prediction mode determination, motion vector derivation, and prediction sample generation procedures may be performed simultaneously, or one procedure may be performed before another procedure. For example, the prediction unit of the encoding apparatus 100 may include a prediction mode determination unit, a motion vector derivation unit, and a prediction sample derivation unit. And, the prediction mode determination unit may determine a prediction mode for the current block, the motion vector derivation unit may derive a motion vector of the current block, and the prediction sample derivation unit may derive prediction samples of the current block. For example, the prediction unit of the encoding apparatus 100 may searche for a block similar to the current block in the reconstructed area of the current picture (or a certain area (search area) of the reconstructed area) through block matching (BM), and derive a reference block having a difference from the current block equal to or less than a minimum or a certain criterion. A motion vector may be derived based on the displacement difference between the reference block and the current block. The encoding apparatus 100 may determine a mode applied to the current block from among various prediction modes. The encoding apparatus 100 may compare RD costs of various prediction modes with each other and determine an optimal prediction mode for the current block.

For example, when the skip mode or merge mode is applied to the current block, the encoding apparatus 100 configures the above-described merge candidate list, and derive the a reference block having a difference from the current block equal to or less than a minimum or a predetermined criterion, among the reference blocks indicated by merge candidates included in the merge candidate list. In this case, the merge candidate associated with the derived reference block may be selected, and merge index information indicating the selected merge candidate may be generated and signaled to the decoding apparatus 200. The motion vector of the current block may be derived by using the motion vector of the selected merge candidate.

As another example, when the (A)MVP mode is applied to the current block, the encoding apparatus 100 constructs the above-described (A)MVP candidate list, and use a motion vector of an mvp candidate selected from among motion vector predictor (mvp) candidates included in the (A)MVP candidate list as the mvp of the current block. In this case, for example, a motion vector pointing to the reference block derived by the above-described motion estimation may be used as the motion vector of the current block, and an mvp candidate, among the mvp candidates, having a motion vector having the smallest difference from the motion vector of the current block may be the selected mvp candidate. A motion vector difference (MVD) that is a difference obtained by subtracting the mvp from the motion vector of the current block may be derived. In this case, information about the MVD may be signaled to the decoding apparatus 200.

The encoding apparatus 100 may derive residual samples based on the prediction samples (S1420). The encoding apparatus 100 may derive the residual samples through comparison of original samples and the prediction samples of the current block.

The encoding apparatus 100 encodes image information including prediction information and residual information (S1430). The encoding apparatus 100 may output the encoded image information in the form of a bitstream. The prediction information is information related to a prediction procedure and may include prediction mode information (eg, skip flag, merge flag, or mode index) and motion vector information. The information about the motion vector may include candidate selection information (eg, merge index, mvp flag, or mvp index) that is information for deriving the motion vector. Also, the motion vector information may include the above-described MVD information. Also, the information about the motion vector may include information indicating whether L0 prediction, L1 prediction, or pairwise (bi) prediction is applied. The residual information is information about residual samples. The residual information may include information about quantized transform coefficients for the residual samples.

The output bitstream may be stored in a (digital) storage medium and delivered to a decoding device, or may be delivered to a decoding device through a network.

Meanwhile, as described above, the encoding apparatus 100 may generate a reconstructed picture (including reconstructed samples and reconstructed blocks) based on reference samples and residual samples. This is for deriving the same prediction result as that performed by the decoding apparatus 200 in the encoding apparatus 100, and through this, coding efficiency can be increased. Accordingly, the encoding apparatus 100 may store the reconstructed picture (or reconstructed samples or reconstructed block) in a memory and use it as a reference picture for inter prediction. As described above, an in-loop filtering procedure may be further applied to the reconstructed picture.

A video/image decoding procedure based on the IBC and a prediction unit in the decoding apparatus 200 may schematically include, for example, the following.

Figure 16:
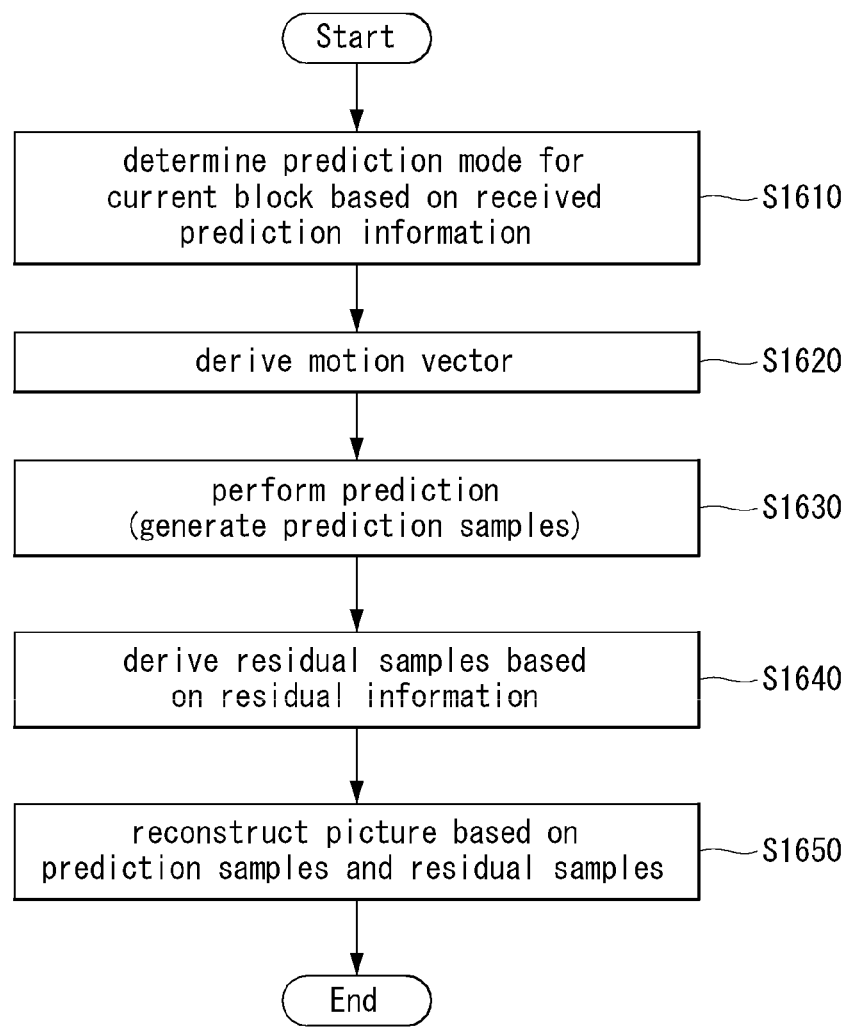
FIGS. 16 and 17 show examples of a prediction unit in a video/image decoding method and a decoding apparatus based on IBC prediction according to an embodiment of the present specification.
Figure 17:
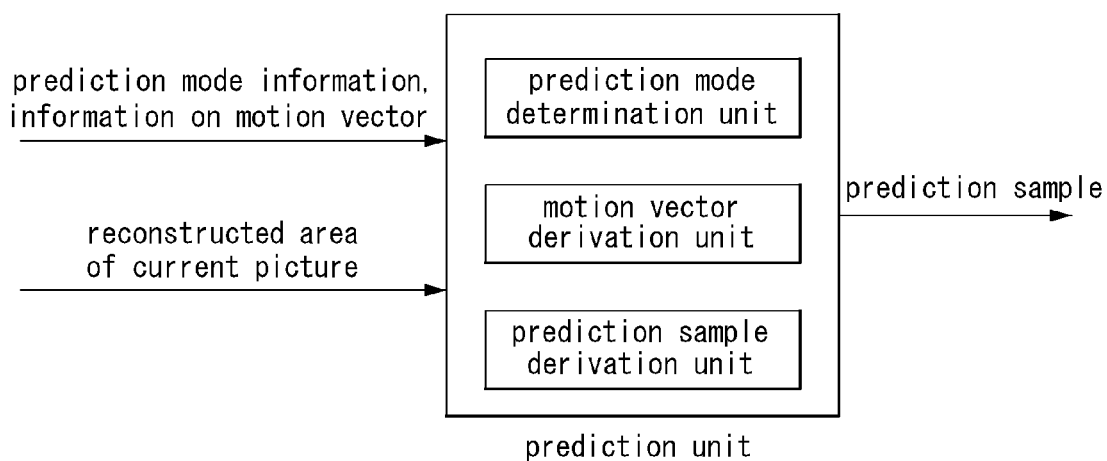

FIGS. 16 and 17 show examples of a prediction unit in a video/image decoding method and a decoding apparatus based on IBC prediction according to an embodiment of the present specification.

The decoding apparatus 200 may perform an operation corresponding to the operation performed by the encoding apparatus 100. The decoding apparatus 200 may perform the IBC prediction on the current block based on the received prediction information and derive prediction samples.

Specifically, the decoding apparatus 200 may determine a prediction mode for the current block based on the received prediction information (S1610). The decoding apparatus 200 may determine which inter prediction mode is applied to the current block based on the prediction mode information in the prediction information.

For example, the decoding apparatus 200 may determine whether the merge mode is applied to the current block or whether or the (A)MVP mode is determined based on the merge flag. Or the decoding apparatus 200 may select one of various inter prediction mode candidates based on the mode index. Inter prediction mode candidates may include a skip mode, a merge mode, and/or an (A)MVP mode, or may include various inter prediction modes to be described later.

The decoding apparatus 200 derives a motion vector of the current block based on the determined prediction mode (S1620). For example, when the skip mode or the merge mode is applied to the current block, the decoding apparatus 200 may construct the above-described merge candidate list and select one merge candidate from among the merge candidates included in the merge candidate list. The selection may be performed based on the above-described selection information (merge index). The motion vector of the current block may be derived using the motion vector of the selected merge candidate. The motion vector of the selected merge candidate may be used as the motion vector of the current block.

As another example, when the (A)MVP mode is applied to the current block, the decoding apparatus 200 may construct the above-described (A)MVP candidate list, and use a motion vector of an mvp candidate selected among candidates included in the (A)MVP candidate list as the mvp of the current block. The selection may be performed based on the above-described selection information (mvp flag or mvp index). In this case, the MVD of the current block may be derived based on the information on the MVD, and the motion vector of the current block may be derived based on the mvp and MVD of the current block. Also, the reference picture index of the current block may be derived based on the reference picture index information. The picture indicated by the reference picture index in the reference picture list for the current block may be derived as a reference picture referenced for inter prediction of the current block.

Meanwhile, as described above, motion information of the current block may be derived without configuring the candidate list, and in this case, the motion vector of the current block may be derived according to the procedure disclosed in the corresponding prediction mode. In this case, the candidate list configuration as described above may be omitted.

The decoding apparatus 200 may generate prediction samples for the current block based on the motion vector of the current block (S1630). Prediction samples of the current block may be derived using samples of the reference block indicated by the motion vector of the current block on the current picture. In this case, a prediction sample filtering procedure for all or some of the prediction samples of the current block may be further performed.

For example, the prediction unit of the decoding apparatus 200 may include a prediction mode determination unit, a motion vector derivation unit, and a prediction sample derivation unit. The prediction mode determination unit determines the prediction mode for the current block based on the received prediction mode information, the motion vector derivation unit derives the motion vector of the current block based on the received motion vector information, and the prediction sample derivation unit derives prediction samples of the current block.

The decoding apparatus 200 generates residual samples for the current block based on the received residual information (S1640). The decoding apparatus 200 may generate reconstructed samples for the current block based on the prediction samples and the residual samples, and generate a reconstructed picture based thereon. (S1650). As described above, an in-loop filtering procedure may be further applied to the reconstructed picture.

Hereinafter, an embodiment of the present specification provides a method of constructing a merge candidate list (AMVP candidate list) for prediction of a block to which the IBC prediction mode is applied (or to which the IBC prediction mode is not applied). More specifically, when the IBC prediction mode is enabled, a method for configuring prediction candidates for an IBC block and a non-IBC block is provided. In the following embodiment, when the IBC prediction is available in the process of compressing a still image or moving picture, a method of constructing a prediction candidate for a block encoded/decoded in the IBC prediction mode and a prediction candidate for a block encoded/decoded in a mode other than the IBC prediction mode is provided, and by the method compression performance can be improved.

FIGS. 18 to 23 show examples of a flowchart for configuring IBC merge candidates and IBC AMVP candidates according to embodiments of the present specification.

An embodiment of the present specification provides a method for configuring IBC merge candidates and IBC AVMP candidates for a block to which the IBC mode is applied. According to this embodiment, when the IBC prediction mode is applied to a current block, a prediction candidate list is constructed using IBC candidates to which the IBC prediction is applied. In addition, if a required number of IBC candidates is not configured, a default candidate (eg, a zero vector) is added to the merge/AVMP candidate list.

According to the embodiment of the present specification, it is checked whether a candidate to be added is coded in the IBC prediction mode when constructing the prediction candidate list for the current block to which the IBC prediction mode is applied, and when the corresponding candidate is coded in the IBC prediction mode, the corresponding candidate is added to the prediction candidate list.

Figure 18:
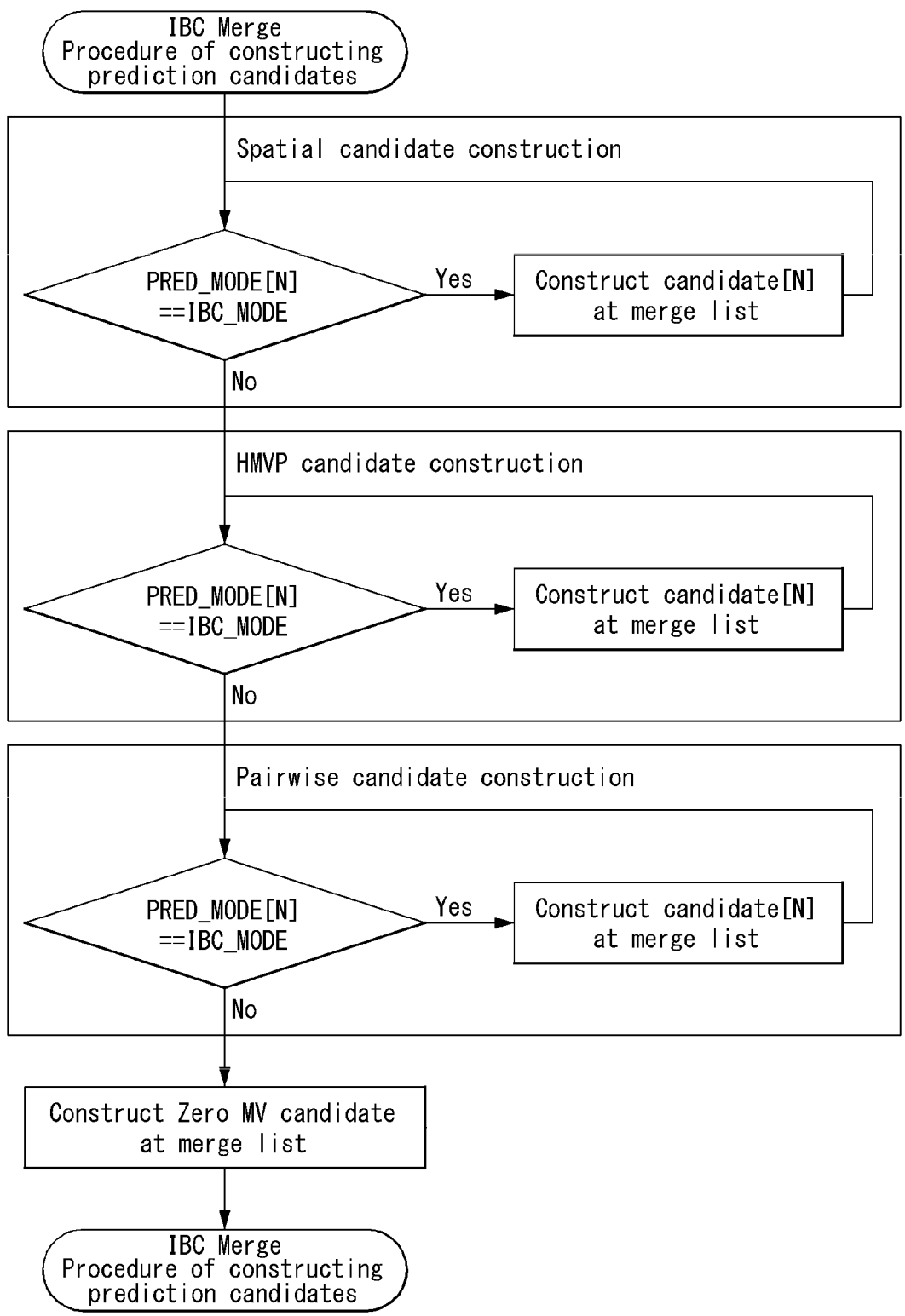
FIGS. 18 to 23 show flow charts illustrating methods of configuring an IBC merge candidate list according to embodiments of the present specification.

FIG. 18 is similar to the construction of the conventional inter prediction merge candidate list, but the temporal merge candidate is excluded because the current picture is referenced due to the characteristics of IBC. That is, the method of constructing the existing merge candidate list, except for the temporal merge candidate, is used and a process of checking whether the IBC prediction mode is applied to each candidate is added.

Referring to FIG. 18, in order to construct a spatial candidate, the coding apparatus (the encoding apparatus 100 or the decoding apparatus 200) searches for spatial neighboring blocks, and checks whether the IBC mode is applied to the candidate (the corresponding candidate), and adds the corresponding candidate to the merge candidate list if the IBC prediction mode is applied.

If the current number of candidates in the merge candidate list is less than the maximum number, the coding apparatus may perform a search for HMVP candidates. The coding apparatus searches for candidates in an history-based motion vector prediction HMVP candidate list (HMVP buffer) to add an HMVP candidate, and adds a candidate to which IBC prediction is applied to the merge candidate list. In this document, the HMVP represents a method of using prediction information (motion vector, reference picture index) of another block that has already been decoded (restored) in the current picture as information for prediction of the current block.

If the current number of candidates in the merge candidate list is less than the maximum number, the coding apparatus may perform a search for pairwise prediction candidates. The pairwise prediction candidates are prediction candidates generated by combining candidates previously configured in the prediction candidate list. For example, by combining the L0 direction block vector (motion vector) of a first candidate and the L1 direction block vector of a second candidate, the pairwise prediction candidate may be generated. Here, the coding apparatus may check whether the IBC prediction is applied to the pairwise prediction candidate, and, when the IBC prediction is applied, add the pairwise prediction candidate to the merge candidate list. When the IBC prediction is applied to both candidates used for the construction of the pairwise prediction candidate, it can be said that the IBC prediction is applied to the pairwise prediction candidate. If the current number of candidates in the merge candidate list is less than the maximum number, the coding apparatus adds a zero vector to the merge candidate list.

Figure 19:
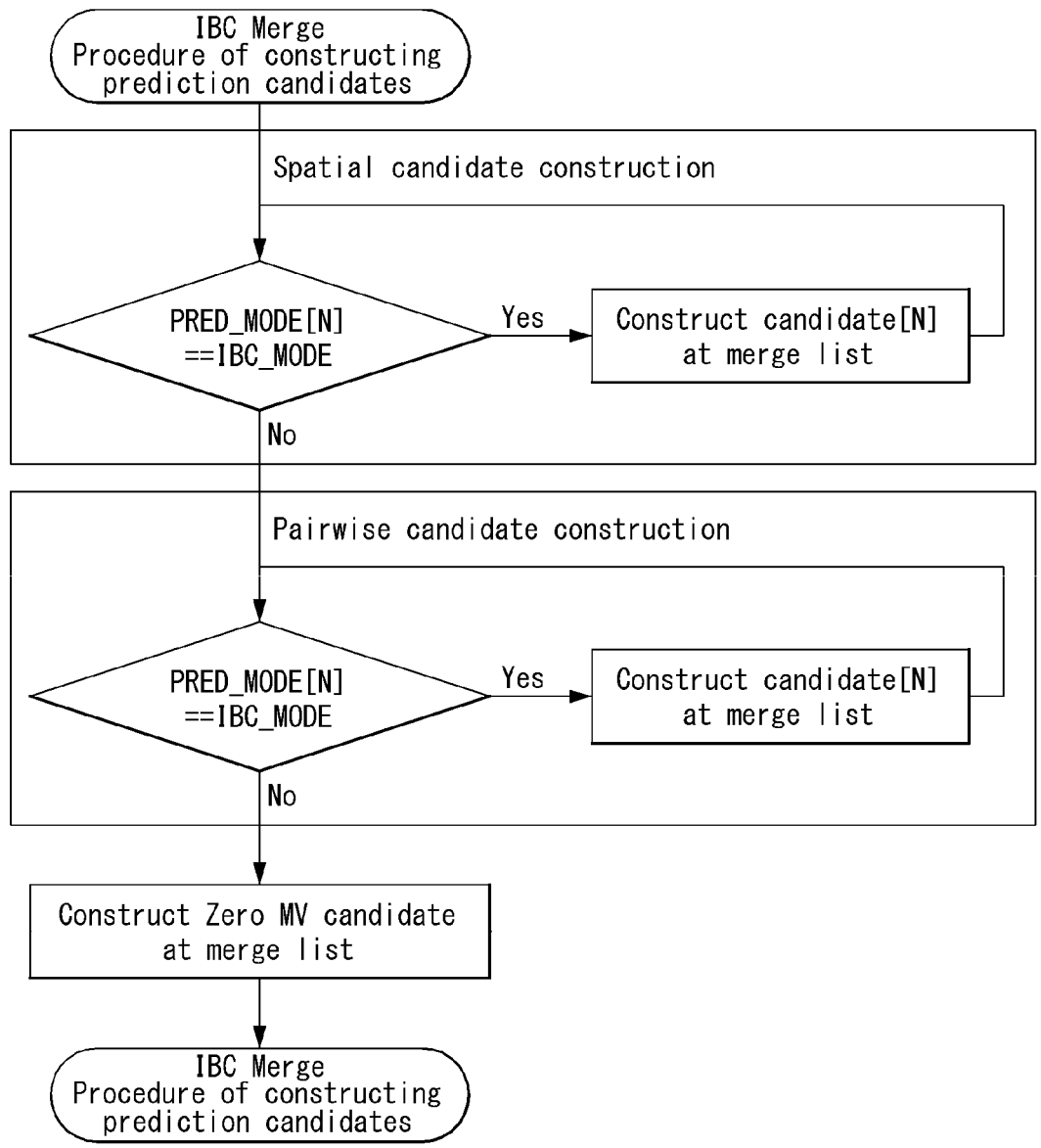

FIG. 19 is similar to configuring the existing inter prediction merge candidate list, but excludes the temporal merge candidate and the HMVP candidate. The reason that HMVP candidates are excluded is that, since the existing HMVP stores a certain number of candidates, when HMVP candidates are used for the IBC prediction, it is necessary to store all IBC/Non-IBC candidates for a limited number of candidates, and due to this prediction performance or memory efficiency may be deteriorated in the construction process of Non-IBC candidates Referring to FIG. 19, in order to construct spatial candidates, the coding apparatus (the encoding apparatus 100 or the decoding apparatus 200) searches for spatial neighboring blocks, checks whether the IBC mode is applied to the candidates, and adds a corresponding candidate to which the IBC prediction mode is applied to the merge candidate list.

If the current number of candidates in the merge candidate list is less than the maximum number, the coding apparatus may perform a search for a pairwise prediction candidate. The pairwise prediction candidate is a prediction candidate generated by combining candidates previously configured in the prediction candidate list. For example, the pairwise prediction candidate may be generated by combining an L0 direction block vector (motion vector) of a first candidate and an L1 direction block vector of a second candidate. Here, the coding apparatus may check whether the IBC prediction has been applied to the pairwise prediction candidate, and when the IBC prediction has been applied, add the corresponding pairwise prediction candidate to the merge candidate list. When the IBC prediction is applied to both candidates used for the construction of the pairwise prediction candidate, it can be said that the IBC prediction is applied to the pairwise prediction candidate. If the current number of candidates in the merge candidate list is less than the maximum number, the coding apparatus adds a zero vector to the merge candidate list.

Figure 20:
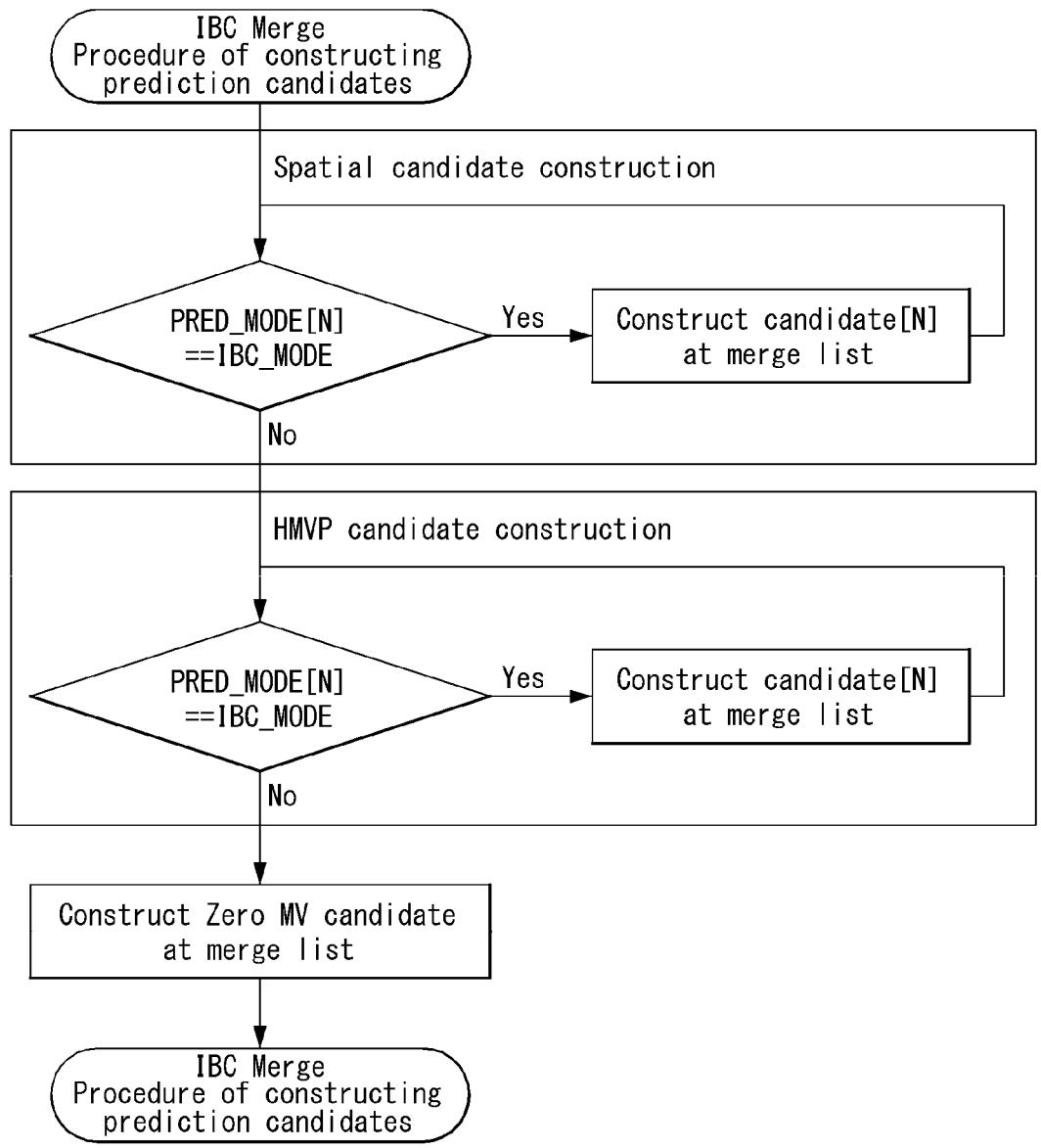

FIG. 20 is similar to the existing method for constructing an inter prediction merge candidate list, but is a case in which a temporal merge candidate and a pairwise prediction candidate are excluded.

Referring to FIG. 20, in order to construct a spatial candidate, the coding apparatus (the encoding apparatus 100 or the decoding apparatus 200) searches for spatially neighboring blocks, checks whether the IBC mode is applied to the candidates, and adds the corresponding candidate to which the IBC mode is applied to the merge candidate list.

If the number of current candidates in the merge candidate list is less than the maximum number, the coding apparatus may perform a search for HMVP candidates. The coding apparatus searches for candidates in an HMVP candidate list (HMVP buffer) to construct a history-based motion vector prediction (HMVP) candidate, and adds a candidate to which the IBC prediction is applied to the merge candidate list. If the current number of candidates in the merge candidate list is less than the maximum number, the coding apparatus adds a zero vector to the merge candidate list.

Figure 21:
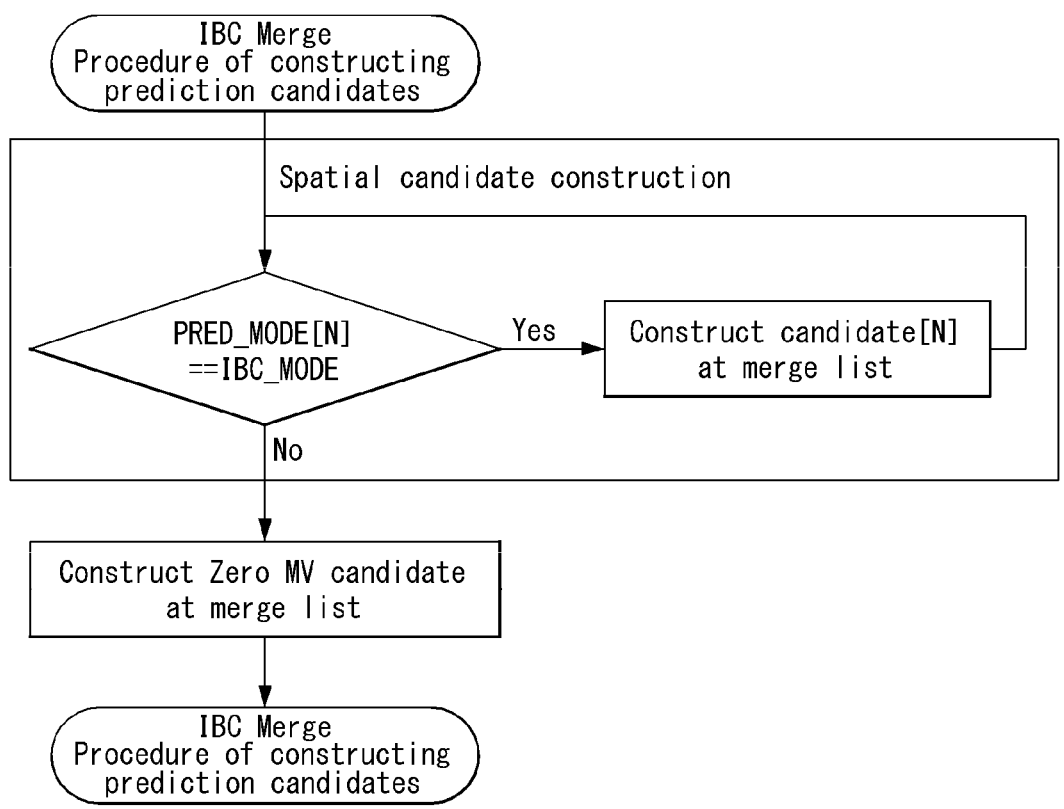

FIG. 21 excludes the pairwise prediction candidates, the HMVP candidates, and the temporal merge candidate in the existing process of constructing the inter prediction merge candidate list.

Referring to FIG. 21, in order to construct spatial candidates, the coding apparatus (the encoding apparatus 100 or the decoding apparatus 200) searches for spatially neighboring blocks, checks whether the IBC mode is applied to the candidate, and adds the corresponding candidate to which the IBC mode is applied to the merge candidate list. If the current number of candidates in the merge candidate list is less than the maximum number, the coding apparatus adds a zero vector to the merge candidate list.

Figure 22:
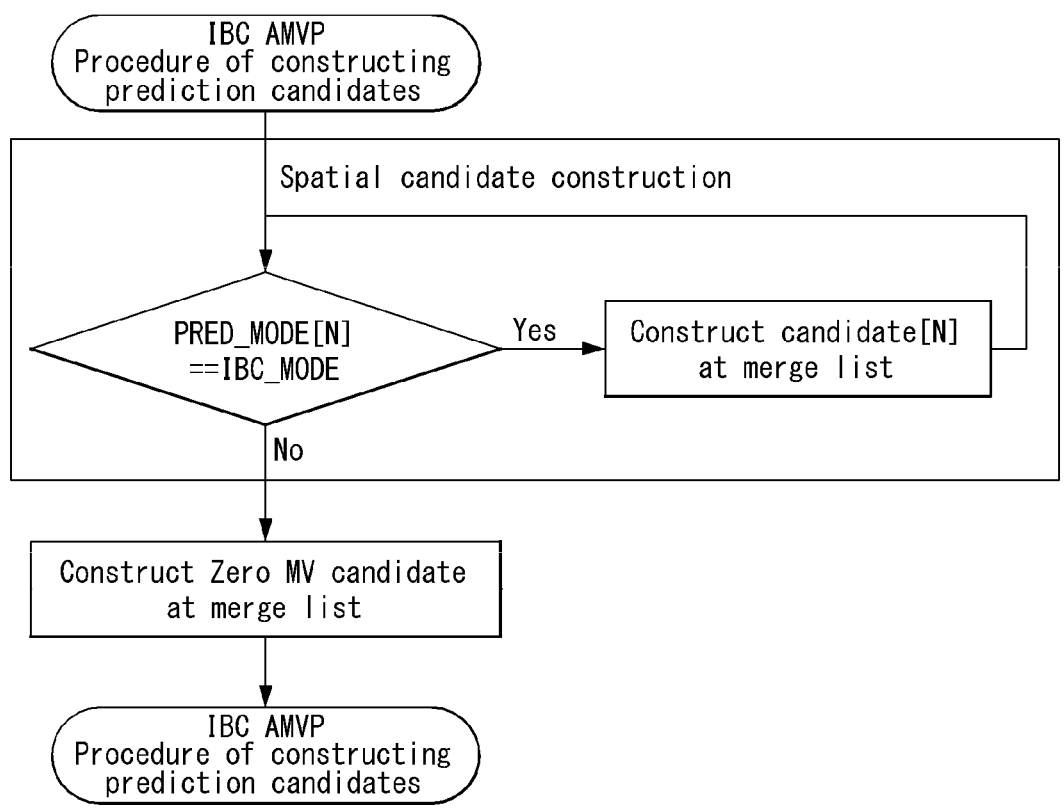

FIG. 22 excludes the temporal merge candidate and the HMVP candidates in the existing process of constructing the inter prediction AMVP candidate list.

Referring to FIG. 22, in order to construct spatial candidates, the coding apparatus (the encoding apparatus 100 or the decoding apparatus 200) searches for spatially neighboring blocks, checks whether the IBC mode is applied to the candidate, and adds the corresponding candidate to which the IBC mode is applied to the AMVP candidate list. If the current number of candidates in the AMVP candidate list is less than the maximum number, the coding apparatus adds a zero vector to the AMVP candidate list.

Figure 23:
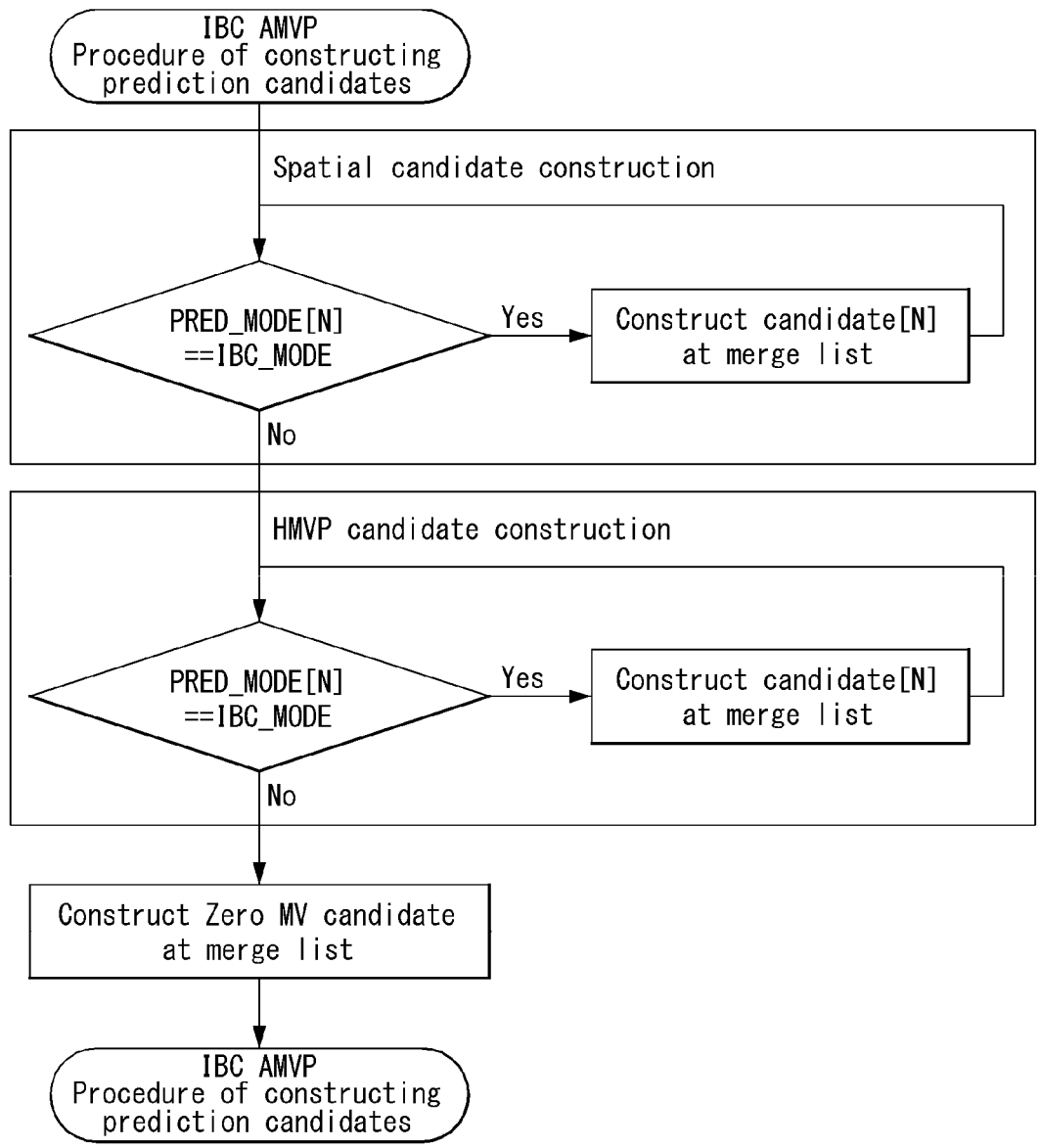

FIG. 23 excludes the temporal merge candidate in the existing process of constructing the inter prediction AMVP candidate list.

Referring to FIG. 23, in order to construct spatial candidates, the coding apparatus (the encoding apparatus 100 or the decoding apparatus 200) searches for spatially neighboring blocks, checks whether the IBC mode is applied to the candidate, and adds the corresponding candidate to which the IBC mode is applied to the AMVP candidate list.

If the number of current candidates in the merge candidate list is less than the maximum number, the coding apparatus may perform a search for HMVP candidates. The coding apparatus searches for candidates in an HMVP candidate list (HMVP buffer) to construct a history-based motion vector prediction (HMVP) candidate, and adds a candidate to which the IBC prediction is applied to the AMVP candidate list. If the current number of candidates in the merge candidate list is less than the maximum number, the coding apparatus adds a zero vector to the AMVP candidate list.

In addition, an embodiment of the present specification provides a merge/AMVP candidate configuration method for an inter prediction mode other than the IBC. It is a method of constructing a candidate list using only non-IBC candidates in a prediction candidate construction process when an inter prediction mode (MODE_INTER) other than the IBC is applied to a current block. If a required number of non-IBC candidates are not configured, it is configured as a default candidate (eg, zero vector).

Figure 24:
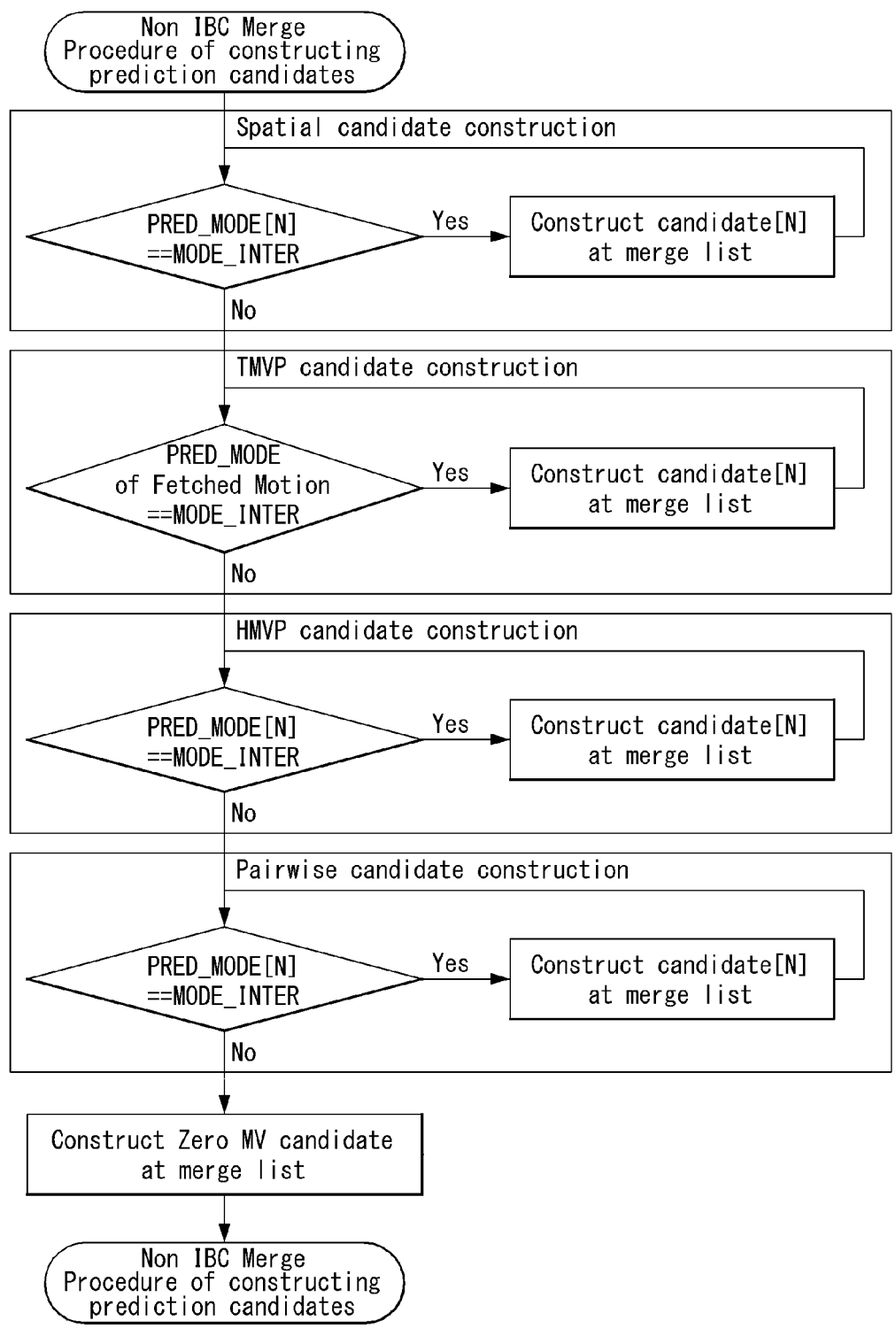
FIGS. 24 and 25 show flow charts illustrating methods of configuring a non-IBC merge candidate list according to embodiments of the present specification.
Figure 25:
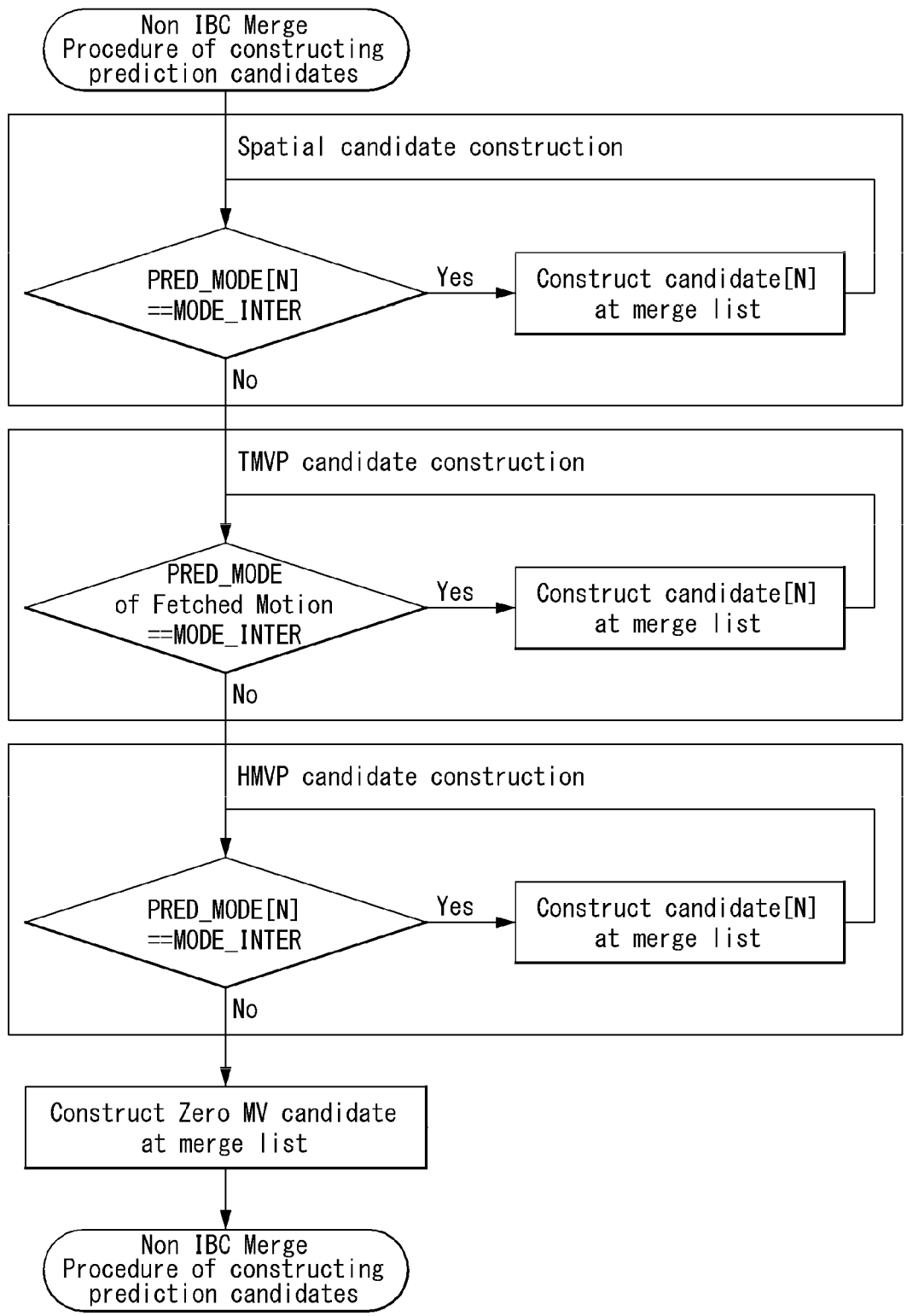

FIGS. 24 and 25 are examples of flowcharts for constructing a prediction candidate list for a block to which inter prediction is applied according to an embodiment of the present specification.

More specifically, the coding apparatus adds the candidate to the prediction candidate list only when the candidate to be added in the construction process of the prediction candidate list is coded with inter prediction (non-IBC). That is, when a candidate to be added to the prediction candidate list is coded in the IBC mode, it is not added to the candidate list.

FIG. 24 shows that it is checked whether the prediction mode of the candidate to be added is the IBC prediction mode in the process of constructing the merge candidate list, and when the IBC prediction mode is not applied to the corresponding candidate (when inter prediction is applied), the corresponding candidate is added to the merge candidate list. When the prediction mode of the candidate to be added is the IBC prediction mode, the corresponding candidate is not added to the merge candidate list.

Referring to FIG. 24, in order to construct a spatial merge candidate, the coding apparatus searches for spatially neighboring blocks, checks whether the inter prediction mode is applied to the corresponding candidate (whether the prediction mode of the corresponding spatial candidate is the inter prediction mode), and adds the corresponding candidate to the merge candidate list when the inter prediction mode is applied (when the IBC prediction mode is not applied). The candidate to which the IBC prediction mode is applied is not added to the merge candidate list.

If the current number of candidates in the merge candidate list is less than the maximum number, the coding apparatus may perform a search for a temporal prediction candidate. The temporal (TMVP) candidate represents the motion information of the block collocated in a picture different from the current block. The coding apparatus searches for col-located blocks (temporally neighboring blocks) in another picture to construct the temporal candidate, and adds a temporal candidate to which the inter prediction is applied (to which the IBC prediction is not applied) to the merge candidate list.

If the number of current candidates in the merge candidate list is less than the maximum number, the coding apparatus may perform a search for HMVP candidates. The coding apparatus searches for candidates in an HMVP candidate list (HMVP buffer) to construct an HMVP candidate, and adds a candidate to which the inter prediction is applied (to which the IBC prediction is not applied) to the merge candidate list.

If the current number of candidates in the merge candidate list is less than the maximum number, the coding apparatus may perform a search for pairwise prediction candidates. The pairwise prediction candidates are prediction candidates generated by combining candidates previously configured in the prediction candidate list. For example, by combining the L0 direction block vector (motion vector) of a first candidate and the L1 direction block vector of a second candidate, the pairwise prediction candidate may be generated. Here, the coding apparatus may check whether the inter prediction is applied (the IBC prediction is not applied), and, when the inter prediction is applied (when the IBC prediction is not applied), add the pairwise prediction candidate to the merge candidate list. When the inter prediction is applied to both candidates used for the construction of the pairwise prediction candidate (when the IBC prediction is not applied to the both candidates), it can be said that the inter prediction is applied to the pairwise prediction candidate. If the current number of candidates in the merge candidate list is less than the maximum number, the coding apparatus adds a zero vector to the merge candidate list.

FIG. 25 shows that it is checked whether the prediction mode of the candidate to be added is the IBC prediction mode in the process of constructing an AMVPe candidate list, and when the IBC prediction mode is not applied to the corresponding candidate (when inter prediction is applied), the corresponding candidate is added to the AMVP merge candidate list. When the prediction mode of the candidate to be added is the IBC prediction mode, the corresponding candidate is not added to the AMVP candidate list.

Referring to FIG. 25, in order to construct a spatial AMVP candidate, the coding apparatus searches for spatially neighboring blocks, checks whether the inter prediction mode is applied to the corresponding candidate (whether the prediction mode of the corresponding spatial candidate is the inter prediction mode), and adds the corresponding candidate to the AMVP candidate list when the inter prediction mode is applied (when the IBC prediction mode is not applied). The candidate to which the IBC prediction mode is applied is not added to the AMVP candidate list.

If the current number of candidates in the AMVP candidate list is less than the maximum number, the coding apparatus may perform a search for a temporal prediction candidate. The temporal (TMVP) candidate represents the motion information of the block collocated in a picture different from the current block. The coding apparatus searches for col-located blocks (temporally neighboring blocks) in another picture to construct the temporal candidate, and adds a temporal candidate to which the inter prediction is applied (to which the IBC prediction is not applied) to the AMVP candidate list.

If the number of current candidates in the AMVP candidate list is less than the maximum number, the coding apparatus may perform a search for HMVP candidates. The coding apparatus searches for candidates in an HMVP candidate list (HMVP buffer) to construct an HMVP candidate, and adds a candidate to which the inter prediction is applied (to which the IBC prediction is not applied) to the AMVP candidate list.

If the current number of candidates in the AMVP candidate list is less than the maximum number, the coding apparatus may perform a search for pairwise prediction candidates. The pairwise prediction candidates are prediction candidates generated by combining candidates previously configured in the prediction candidate list. For example, by combining the L0 direction block vector (motion vector) of a first candidate and the L1 direction block vector of a second candidate, the pairwise prediction candidate may be generated. Here, the coding apparatus may check whether the inter prediction is applied (the IBC prediction is not applied), and, when the inter prediction is applied (when the IBC prediction is not applied), add the pairwise prediction candidate to the AMVP candidate list. When the inter prediction is applied to both candidates used for the construction of the pairwise prediction candidate (when the IBC prediction is not applied to the both candidates), it can be said that the inter prediction is applied to the pairwise prediction candidate. If the current number of candidates in the merge candidate list is less than the maximum number, the coding apparatus adds a zero vector to the AMVP candidate list.

As in the previous embodiments, in the process of constructing a prediction candidate list for a non-IBC block, it is of course possible to omit a search for any one type among various types of candidates (spatial candidates, a temporal candidate, HMVP candidates, and pairwise prediction candidates).

Figure 26:
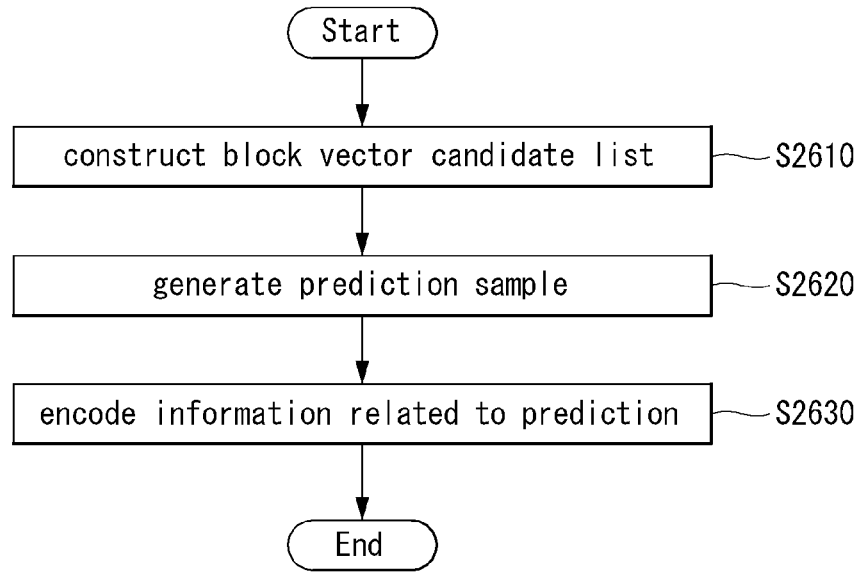
FIG. 26 is an example of a flowchart for encoding of video data according to an embodiment of the present specification.

FIG. 26 is an example of a flowchart for encoding of video data according to an embodiment of the present specification. The operation of FIG. 26 may be performed by the inter prediction unit 180 of the encoding apparatus 100.

Referring to FIG. 26, the encoding apparatus 100 constructs a block vector candidate list for the current block to which the IBC prediction mode referring to another block in a current picture is applied (S2610). Here, the encoding apparatus 100 may add a corresponding candidate to a block vector candidate list only when the prediction mode of the corresponding candidate to be added is the IBC prediction mode in the process of constructing the block vector candidate list (merge candidate list/AMVP candidate list). That is, the encoding apparatus 100 may add the candidate (a spatial candidate, a temporal candidate, an HMVP candidate, or a pairwise prediction candidate) to which the IBC prediction mode is applied to the block vector candidate list.

In an embodiment, in order to construct the block vector candidate list, the encoding apparatus 100 may construct the block vector candidate list from the spatial neighboring blocks to which the IBC prediction mode is applied, and change the block vector candidate list based on the HMVP candidates to which the IBC prediction mode is applied when the current number of candidates in the block vector candidate list is smaller than a maximum number of candidates.

In an embodiment, if the current number of candidates in the changed block vector candidate list is less than the maximum number of candidates, the encoding apparatus 100 may add a zero vector to the changed block vector candidate list. In an embodiment, the encoding apparatus 100 may add a zero vector to the changed block vector candidate list until the current number of candidates is equal to the maximum number of candidates.

In an embodiment, the spatial neighboring blocks may include at least one of a left neighboring block, a lower left neighboring block, an upper neighboring block, a right neighboring block, or a right neighboring block of the current block.

In an embodiment, the encoding apparatus 100 may add a pairwise candidate generated based on a combination of the block vectors included in the changed block vector candidate list to the block vector candidate list.

In an embodiment, if the current number of candidates in the block vector candidate list to which the pairwise candidates are added is less than the maximum number of candidates, a zero vector may be added to the block vector candidate list.

The encoding apparatus 100 generates a prediction sample for the current block based on the block vector candidate list constructed as in the embodiments of the present specification (S2620). For example, the encoding apparatus 100 may generate a prediction sample by using the block vector (motion vector) of the candidate indicated by a merge index in the block vector candidate list (merge candidate list). Specifically, the prediction sample may be generated using the sample value indicated by the block vector in the current picture including the current block.

In addition, with respect to a block to which the inter prediction mode other than the IBC prediction mode is applied, the encoding apparatus 100 may determine whether the prediction mode of the candidate to be added to construct the block vector candidate list is the same prediction mode as the current block (inter prediction mode), and add the corresponding candidate to the block vector candidate list in case that the prediction modes are same (inter prediction mode).

The encoding apparatus 100 encodes information related to the prediction of the current block (S2630).

Figure 27:
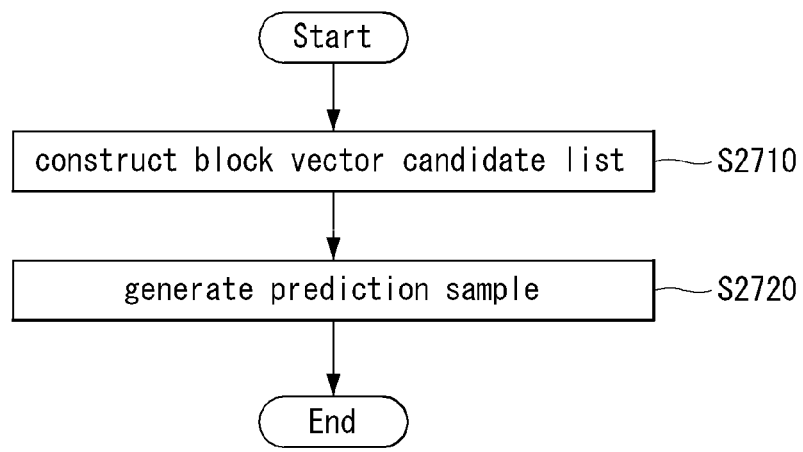
FIG. 27 is an example of a flowchart for decoding video data according to an embodiment of the present specification.

FIG. 27 is an example of a flowchart for decoding video data according to an embodiment of the present specification. The operations of FIG. 27 may be performed by the inter prediction unit 260 of the decoding apparatus 200.

The decoding apparatus 200 constructs a block vector candidate list for the current block to which the IBC prediction mode referring to another block in the current picture is applied (S2710).

The decoding apparatus 200 generates a prediction sample for the current block based on the block vector candidate list (S2720). Here, the decoding apparatus 100 may add the candidate to the block vector candidate list only when the prediction mode of the candidate to be added is the IBC prediction mode in the process of constructing the block vector candidate list (merge candidate list/AMVP candidate list). That is, the decoding apparatus 200 may add the candidate (a spatial candidate, a temporal candidate, an HMVP candidate, or a pairwise prediction candidate) to which the IBC prediction mode is applied to the block vector candidate list.

In an embodiment, in order to construct the block vector candidate list, the decoding apparatus 200 may construct the block vector candidate list from the spatial neighboring blocks to which the IBC prediction mode is applied, and change the block vector candidate list based on the HMVP candidates to which the IBC prediction mode is applied when the current number of candidates in the block vector candidate list is smaller than a maximum number of candidates.

In an embodiment, if the current number of candidates in the changed block vector candidate list is less than the maximum number of candidates, the decoding apparatus 200 may add a zero vector to the changed block vector candidate list. In an embodiment, the encoding apparatus 100 may add a zero vector to the changed block vector candidate list until the current number of candidates is equal to the maximum number of candidates.

In an embodiment, the spatial neighboring blocks may include at least one of a left neighboring block, a lower left neighboring block, an upper neighboring block, a right neighboring block, or a right neighboring block of the current block.

In an embodiment, the decoding apparatus 200 may add a pairwise candidate generated based on a combination of the block vectors included in the changed block vector candidate list to the block vector candidate list.

In an embodiment, if the current number of candidates in the block vector candidate list to which the pairwise candidates are added is less than the maximum number of candidates, a zero vector may be added to the block vector candidate list.

The decoding apparatus 200 may generate a prediction sample by using the block vector (motion vector) of the candidate indicated by a merge index in the block vector candidate list (merge candidate list). Specifically, the prediction sample may be generated using the sample value indicated by the block vector in the current picture including the current block.

In addition, with respect to a block to which the inter prediction mode other than the IBC prediction mode is applied, the decoding apparatus 200 may determine whether the prediction mode of the candidate to be added to construct the block vector candidate list is the same prediction mode as the current block (inter prediction mode), and add the corresponding candidate to the block vector candidate list in case that the prediction modes are same (inter prediction mode).

Bitstream

The encoded information (e.g., encoded video/image information) derived by the encoding device 100 based on the above-described embodiments of the disclosure may be output in the form of a bitstream. The encoded information may be transmitted or stored in NAL units, in the form of a bitstream. The bitstream may be transmitted over a network, or may be stored in a non-transitory digital storage medium. Further, as described above, the bitstream is not directly transmitted from the encoding device 100 to the decoding device 200, but may be streamed/downloaded via an external server (e.g., a content streaming server). The network may include, e.g., a broadcast network and/or communication network, and the digital storage medium may include, e.g., USB, SD, CD, DVD, Bluray, HDD, SSD, or other various storage media.

The processing methods to which embodiments of the disclosure are applied may be produced in the form of a program executed on computers and may be stored in computer-readable recording media. Multimedia data with the data structure according to the disclosure may also be stored in computer-readable recording media. The computer-readable recording media include all kinds of storage devices and distributed storage devices that may store computer-readable data. The computer-readable recording media may include, e.g., Bluray discs (BDs), universal serial bus (USB) drives, ROMs, PROMs, EPROMS, EEPROMs, RAMs, CD-ROMs, magnetic tapes, floppy disks, and optical data storage. The computer-readable recording media may include media implemented in the form of carrier waves (e.g., transmissions over the Internet). Bitstreams generated by the encoding method may be stored in computer-readable recording media or be transmitted via a wired/wireless communication network.

The embodiments of the disclosure may be implemented as computer programs by program codes which may be executed on computers according to an embodiment of the disclosure. The computer codes may be stored on a computer-readable carrier.

The above-described embodiments of the disclosure may be implemented by a non-transitory computer-readable medium storing a computer-executable component configured to be executed by one or more processors of a computing device. According to an embodiment of the disclosure, the computer-executable component may be configured to determine whether a PCM mode in which a sample value of a current block in video data is transferred via a bitstream is applied, identify a reference index related to a reference line for intra prediction of the current block based on the PCM mode being not applied, and generate a prediction sample of the current block based on a reference sample included in a reference line related to the reference index. Further, according to an embodiment of the disclosure, the computer-executable component may be configured to execute operations corresponding to the video data processing method described with reference to FIGS. 13 and 14.

The decoding device 200 and the encoding device 100 to which the disclosure is applied may be included in a digital device. The digital devices encompass all kinds or types of digital devices capable of performing at least one of transmission, reception, processing, and output of, e.g., data, content, or services. Processing data, content, or services by a digital device includes encoding and/or decoding the data, content, or services. Such a digital device may be paired or connected with other digital device or an external server via a wired/wireless network, transmitting or receiving data or, as necessary, converting data.

The digital devices may include, e.g., network TVs, hybrid broadcast broadband TVs, smart TVs, internet protocol televisions (IPTVs), personal computers, or other standing devices or mobile or handheld devices, such as personal digital assistants (PDAs), smartphones, tablet PCs, or laptop computers.

As used herein, "wired/wireless network" collectively refers to communication networks supporting various communication standards or protocols for data communication and/or mutual connection between digital devices or between a digital device and an external server. Such wired/wireless networks may include communication networks currently supported or to be supported in the future and communication protocols for such communication networks and may be formed by, e.g., communication standards for wired connection, including USB (Universal Serial Bus), CVBS(Composite Video Banking Sync), component, S-video(analog), DVI(Digital Visual Interface), HDMI (High Definition Multimedia Interface), RGB, or D-SUB and communication standards for wireless connection, including Bluetooth, RFID (Radio Frequency Identification), IrDA(infrared Data Association), UWB(Ultra-Wideband), ZigBee, DLNA(Digital Living Network Alliance), WLAN(Wireless LAN)(Wi-Fi), Wibro(Wireless broadband), Wimax(World Interoperability for Microwave Access), HSDPA(High Speed Downlink Packet Access), LTE(Long Term Evolution), or Wi-Fi Direct.

Hereinafter, when simply referred to as a digital device in the disclosure, it may mean either or both a stationary device or/and a mobile device depending on the context.

Meanwhile, the digital device is an intelligent device that supports, e.g., broadcast reception, computer functions, and at least one external input, and may support, e.g., e-mail, web browsing, banking, games, or applications via the above-described wired/wireless network. Further, the digital device may include an interface for supporting at least one input or control means (hereinafter, input means), such as a handwriting input device, a touch screen, and a spatial remote control. The digital device may use a standardized general-purpose operating system (OS). For example, the digital device may add, delete, amend, and update various applications on general-purpose OS kernel, thereby configuring and providing a user-friendlier environment.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

What is claimed is:

1. A method of processing video data, comprising: obtaining a flag on whether a current block is coded in a first prediction mode, the first prediction mode referring to another block in a current picture; determining whether the current block is coded in the first prediction mode based on the flag; configuring a block vector candidate list of the current block based on the current block being coded in the first prediction mode; and generating a prediction sample of the current block based on a block vector included in the block vector candidate list, wherein configuring the block vector candidate list comprises: configuring the block vector candidate list only based on a spatial neighboring block to which the first prediction mode is applied, an history-based motion vector prediction (HMVP) candidate to which the first prediction mode is applied and a zero vector by adding a block vector of the spatial neighboring block, the HMVP candidate and the zero vector to the block vector candidate list in an order of the block vector of the spatial neighboring block, the HMVP candidate and the zero vector, and wherein the zero vector is added to the block vector candidate list until a number of current candidates of the block vector candidate list becomes a maximum candidate number.

2. The method of claim 1, wherein the flag is obtained from a coding unit level.

3. The method of claim 1, wherein the spatial neighboring block includes at least one of a left side neighboring block, a left-bottom neighboring block, a top side neighboring block, or a top-right neighboring block.

4. A method of encoding video data, comprising: determining whether to apply a first prediction mode to a current block, the first mode referring to another block in a current picture; generating a flag on whether the first prediction mode is applied to the current block; configuring a block vector candidate list of the current block based on the first prediction mode being applied to the current block; generating a prediction sample of the current block based on a block vector included in the block vector candidate list; and encoding information related to a prediction of the current block, wherein configuring the block vector candidate list comprises: configuring the block vector candidate list only based on a spatial neighboring block to which the first prediction mode is applied, an history-based motion vector prediction (HMVP) candidate to which the first prediction mode is applied and a zero vector by adding a block vector of the spatial neighboring block, the HMVP candidate and the zero vector to the block vector candidate list in an order of the block vector of the spatial neighboring block, the HMVP candidate and the zero vector, and wherein the zero vector is added to the block vector candidate list until a number of current candidates of the block vector candidate list becomes a maximum candidate number.

5. The method of claim 4, wherein the flag is generated in a coding unit level.

6. The method of claim 4, wherein the spatial neighboring block includes at least one of a left side neighboring block, a left-bottom neighboring block, a top side neighboring block, or a top-right neighboring block.

7. A transmission method for data comprising a bitstream for an image, the method comprising: obtaining the bitstream for the image; and transmitting the data comprising the bitstream, wherein the bitstream is generated by performing steps of: determining whether to apply a first prediction mode to a current block, the first mode referring to another block in a current picture;

generating a flag on whether the first prediction mode is applied to the current block; configuring a block vector candidate list of the current block based on the first prediction mode being applied to the current block; generating a prediction sample of the current block based on a block vector included in the block vector candidate list; and encoding information related to a prediction of the current block, wherein the configuring of the block vector candidate list comprises: configuring the block vector candidate list only based on a spatial neighboring block to which the first prediction mode is applied, an history-based motion vector prediction (HMVP) candidate to which the first prediction mode is applied and a zero vector by adding a block vector of the spatial neighboring block, the HMVP candidate and the zero vector to the block vector candidate list in an order of the block vector of the spatial neighboring block, the HMVP candidate and the zero vector, and wherein the zero vector is added to the block vector candidate list until a number of current candidates of the block vector candidate list becomes a maximum candidate number.

* * * * *